US005669853A

United States Patent [19]
Jang

[11] Patent Number: 5,669,853
[45] Date of Patent: Sep. 23, 1997

[54] HYDRAULIC CONTROL SYSTEM FOR FOUR-SPEED AUTOMATIC TRANSMISSION OF AUTOMOTIVE VEHICLE

[75] Inventor: Jaeduk Jang, Kyungki-do, Rep. of Korea

[73] Assignee: Hyundai Motor Company, Rep. of Korea

[21] Appl. No.: 621,453

[22] Filed: Mar. 25, 1996

[30] Foreign Application Priority Data

Aug. 22, 1995 [KR] Rep. of Korea ............... 95-25936

[51] Int. Cl.⁶ ..................................... F16H 59/20
[52] U.S. Cl. ............... 477/133; 477/130; 477/154; 477/131
[58] Field of Search .................... 477/131, 132, 477/133, 154, 155, 130; 475/123

[56] References Cited

U.S. PATENT DOCUMENTS

| | | |
|---|---|---|
| 4,506,563 | 3/1985 | Hiramatsu . |
| 4,538,482 | 9/1985 | Hiramatsu . |
| 5,048,373 | 9/1991 | Sumimoto et al. ............. 477/133 X |
| 5,269,203 | 12/1993 | Ueda ............................ 477/131 |
| 5,269,204 | 12/1993 | Moroto et al. ................. 477/131 |
| 5,293,789 | 3/1994 | Goto et al. .................... 477/151 |
| 5,399,131 | 3/1995 | Kamada et al. ............... 477/150 |
| 5,433,124 | 7/1995 | Person .......................... 477/131 X |
| 5,439,427 | 8/1995 | Enokido et al. ............... 477/130 |
| 5,472,389 | 12/1995 | Ando et al. ................... 477/131 X |
| 5,501,645 | 3/1996 | Taniguchi et al. ............ 477/131 X |
| 5,540,634 | 7/1996 | Jang et al. .................... 477/131 |
| 5,565,000 | 10/1996 | Jang ............................. 477/132 X |

*Primary Examiner*—Charles A. Marmor
*Assistant Examiner*—Peter T. Kwon
*Attorney, Agent, or Firm*—Finnegan, Henderson, Farabow, Garrett & Dunner, L.L.P.

[57] ABSTRACT

In a hydraulic control system for automatic transmissions of a vehicle, drive pressure is fed to a first friction member at the first, second and third speeds of a "D" range, drive pressure is fed to a third friction member at a fourth speed, a 2–4/3–4 shift valve for exhausting pressure from the first friction member at third-to-fourth and second-to-fourth speed shifting is connected to an end clutch valve to allow pressure from a first pressure control valve to be fed to the third friction member at the fourth speed, and exhausting of pressure from a releasing conduit of a second friction member and the third friction member via an exhaust conduit connecting the 2–4/3–4 shift valve and a 2–3/4–3 shift valve during fourth-to-second, fourth-to-first and third-to-second speed shifting is delayed by an orifice.

9 Claims, 20 Drawing Sheets

S3: OFF → DUTY CONTROL → OFF
S4: OFF

S3: OFF → DUTY CONTROL → OFF
S4: OFF
C1,C2(SR)PRESSURE: EXHANSTED PRESSURE CONTROL

S3: OFF → DUTY CONTROL → OFF
S4: OFF

S3: OFF
S4: OFF→DUTY CONTROL→OFF
C3 PRESSURE: DELAYED BY ORIFICE

S3: OFF→DUTY CONTROL→OFF
S4: OFF
C3 PRESSURE: DELAYED BY ORIFICE
REACTION FORCE IS CONTROLLED
BY ONE-WAY CLUTCH

S3: OFF→DUTY CONTROL→OFF
S4: OFF
C3,C2(SR)PRESSURE: EXHANSTED
PRESSURE CONTROL

S3: OFF
S4: OFF→DUTY CONTROL→OFF
C1 PRESSURE: DELAYED BY ORIFICE

S3: OFF
S4: OFF
REACTION FORCE IS CONTROLLED
BY ONE-WAY CLUTCH

FIG.25

| SOLENOID VALVE | SHIFT CONTROL SOLENOID VALVE | | FIRST PRESSURE CONTROL VALVE | | FIRST PRESSURE SOLENOID | | FIRST PRESSURE CONTROL VALVE | | FIRST PRESSURE SOLENOID | | REMARK |
|---|---|---|---|---|---|---|---|---|---|---|---|
| SHIFTING MODE | S1 | S2 | DURING SHIFTING | AFTER SHIFTING | DURING SHIFTING | AFTER SHIFTING | | |
| N → D | OFF | ON | DUTY CONTROL | OFF | DUTY CONTROL | OFF | SHIFTING TO SECOND SPEED |
| N → R | — | — | DUTY CONTROL | OFF | OFF | OFF | |
| FIRST SPEED | ON | ON | — | ON | — | OFF | |
| 1 → 2 | ON→OFF | ON | DUTY CONTROL | OFF | OFF | OFF | |
| SECOND SPEED | OFF | ON | — | OFF | — | OFF | |
| 2 → 3 | OFF | ON→OFF | DUTY CONTROL | OFF | — | OFF | |
| THIRD SPEED | OFF | OFF | — | OFF | — | OFF | FAIL SAFE MODE |
| 3 → 4 | OFF→ON | OFF | DUTY CONTROL | OFF | — | OFF | |
| FOURTH SPEED | ON | OFF | — | OFF | — | OFF | |
| 4 → 3 | ON→OFF | OFF | OFF | OFF | DUTY CONTROL | OFF | |
| 4 → 2 | ON→OFF | OFF→ON | OFF | OFF | DUTY CONTROL | OFF | |
| 4 → 1 | ON | OFF→ON | OFF | OFF | DUTY CONTROL | OFF | |
| 3 → 2 | OFF | OFF→ON | DUTY CONTROL | OFF | OFF | OFF | |
| 2 → 4 | OFF→ON | ON→OFF | OFF | OFF | DUTY CONTROL | OFF | |
| 2 → 1 | OFF→ON | ON | ON | ON | OFF | OFF | |
| 2 → L | ON | ON | DUTY CONTROL | OFF | OFF | OFF | |

5,669,853

HYDRAULIC CONTROL SYSTEM FOR FOUR-SPEED AUTOMATIC TRANSMISSION OF AUTOMOTIVE VEHICLE

BACKGROUND OF THE INVENTION

1. Field of the Invention

The present invention relates to a hydraulic control system for a four-speed automatic transmission of an automotive vehicle and, in particular, to a hydraulic control system of an automatic transmission in which fourth-to-first kick-down skip shifting, fourth-to-second kick-down skip shifting and second-to-fourth lift foot up shifting are possible to improve shift response and in which friction members actuated at first, second and third speeds of a "D" range and friction members actuated at third and fourth speeds of "D" range are directly clutch controlled to allow the hydraulic control system to be controlled easily.

2. Description of the Prior Art

In a conventional vehicle automatic transmission, a driving force from the engine is transmitted to a gear train via a torque converter.

The gear train including one or more planetary gear sets has input, reaction and output members to output adequate shift ratios. In the planetary gear set, selection of the input, reaction and output members is performed by using a plurality of friction members and one-way clutches, and the friction members are selectively controlled at adequate timing to perform the speed shifting by the hydraulic control system which includes solenoid valves controlled by a transmission control unit (TCU).

Skip shifting from the fourth speed to the second speed can be performed in conventional hydraulic control systems for four speed automatic transmissions. However, as a short term of third speed is interposed between the skip shifting from the fourth speed to the second speed, this skip shifting takes time and, thus, makes shift response slow. Also, in those conventional hydraulic control systems, second-to-fourth and fourth-to-second speed skip shifting is not possible so that shift response is bad. Furthermore, in those conventional hydraulic control systems, releasing pressure of the friction members actuated at the first, second and third speeds of the "D" range and the friction members actuated at the third and fourth speeds of the "D" range is varied according to actuating pressure of the friction member actuated at the "R" range such that the controlling of the speed shifting is sophisticated and shift response is further worsened.

U.S. Pat. No. 4,538,482 discloses a hydraulic control system wherein the friction members actuated at first, second and third speeds of the "D" range after a shifting to the third speed are actuated without controlling the same at the time of fourth-to-third down-shifting by controlling friction members used for a reverse range. U.S. Pat. No. 4,506,563 discloses another hydraulic control system wherein the friction members actuated at third and fourth speeds of the "D" range after a shifting to the third speed are actuated without controlling the same at the time of second-to-third up-shifting by controlling friction members used for first, second and third speeds of the "D" range. These conventional hydraulic control systems do not provide enough of a solution to the above-mentioned problems.

SUMMARY OF THE INVENTION

Accordingly, the object of the present invention is to provide a hydraulic control system for automatic transmissions, which is able to perform fourth-to-first kick-down skip shifting, fourth-to-second kick-down skip shifting and second-to-fourth lift fool up to improve shift response and in which friction members actuated at first, second and third speeds of "D" range and friction members actuated at the third and fourth speeds of "D" range are directly clutch controlled to allow the hydraulic system to be controlled easily.

To accomplish the object, the present invention provides a hydraulic control system for automatic transmissions, comprising: a hydraulic pump for pressurizing fluids, a torque converter for transmitting engine power to the transmission, a pressure regulating valve connected to the hydraulic pump, together with a damper clutch for varying line pressure by a damper clutch control solenoid valve controlled according to a duty ratio when converting a drive mode and driving at a high speed; a reducing valve connected to the hydraulic pump for reducing line pressure; a manual valve operated by a shift select lever for selectively feeding pressure from the hydraulic pump to a drive pressure conduit at a "D" range and to a fifth friction member via a reverse pressure conduit at an "R" range; a shift control valve connected to the drive pressure conduit for feeding drive pressure to a plurality of shift valves by operation of two shift control solenoid valves which are controlled to ON/OFF states or controlled according to duty ratios by a transmission control unit according to vehicle speed and throttle valve opening a 2-4/3-4 shift valve for feeding drive pressure to a first friction member at first, second and third speeds of the "D" range and to a third friction member at a fourth speed of the "D" range and releasing pressure from the first friction member when speed shifting from third-to-fourth and second-to-fourth; a first pressure control valve controlled by a first pressure control solenoid valve for feeding drive pressure to the second and third friction members at the second, third and fourth speeds of the "D" range; a second pressure control valve controlled by a second pressure control solenoid valve according to a duty ratio for feeding pressure to the first friction member at the first, second and third speeds of the "D" range and to the third friction member at the fourth speed of the "D" range by the 2-4/3-4 shift valve a 1-2 shift valve for feeding pressure to the second and third friction members and for feeding drive pressure from the 2-4/3-4 shift valve to the third friction member at the fourth speed according to a second speed line pressure of the shift control valve, an end clutch valve for feeding pressure to the third friction member according to fourth speed line pressure of the shift control valve; and a 2-3/4-3 shift valve for feeding pressure to the actuating conduit of the third friction member at the third speed according to third and fourth speed line pressure from the shift control valve and for releasing pressure of the second and third friction members when speed shifting form third-to-fourth, fourth-to-second, fourth-to-first and third-to-second.

In another aspect, the 2-4/3-4 shift valve is connected to the end clutch valve to feed pressure from the first pressure control valve to the third friction member at the fourth speed.

In a further aspect, an orifice is provided in an exhaust conduit connecting the 2-4/3-4 shift valve and the 2-3/4-3 shift valve to provide time lags in releasing the second and third friction members when speed shifting from fourth-to-second, fourth-to-first and third-to-second.

In a still further aspect, the shift control valve, during a shifting from the second speed to the fourth speed, controls the 1-2 shift valve by opening the second, third and fourth speed lines to feed pressure from the first pressure control valve to the second friction member, via the end clutch valve, and controls the 2-4/3-4 shift valve to feed pressure from the second pressure control valve to the third friction member via the end clutch valve and to release the first friction member.

The accompanying drawings, which are incorporated in and constitute a part of this specification, illustrate an embodiment of the invention and, together with the description, serve to explain the principles of the invention.

BRIEF DESCRIPTION OF THE DRAWINGS

FIG. 25 is a table showing the operation status of solenoid valves used in the hydraulic control system shown in FIG. 1 for each mode.

DESCRIPTION OF THE PREFERRED EMBODIMENT

Figure 1:
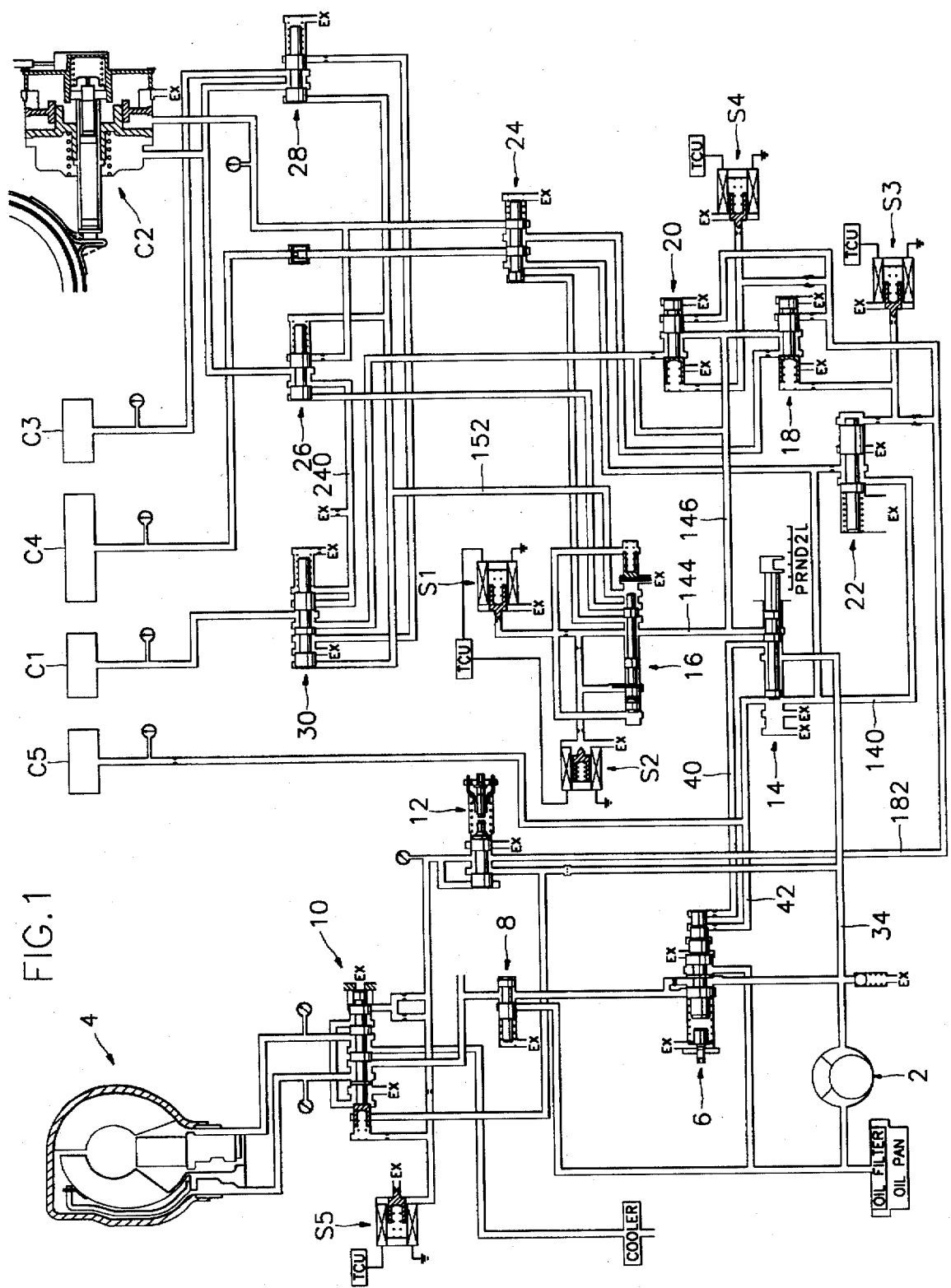
FIG. 1 is a hydraulic circuit diagram of an embodiment of a hydraulic control system according to the present invention in a neutral "N" mode of operations.

FIG. 1 illustrates a state of the hydraulic control system according to the present invention when a shift select lever is set to an "N" range.

The hydraulic control system of an automatic transmission includes a hydraulic pump 2 for pressurizing fluids, a torque converter 4 for transmitting engine power to the automatic transmission, a pressure regulating valve 6 for adjusting pressure from the hydraulic pump 2 to a constant line pressure, a torque converter control valve 8 for maintaining a constant pressure for the torque converter and for lubrication purposes, and a damper clutch control valve 10 for controlling pressure acting on a damper clutch disposed within the torque converter.

Also, the hydraulic control system includes a reducing valve 12 for reducing line pressure, a manual valve 14 operated by a shift select 1ever for selectively feeding line pressure to each valve, a shift control valve 16 which is controlled by ON/OFF-operation of two shift control solenoid valves S1 and S2.

Also, the hydraulic control system includes pressure control valves 18 and 20 controlled by pressure control solenoid valves S3 and S4 to prevent shift shock and an N-R control valve 22 to prevent shift shock during shifting from neutral to reverse.

Also, the hydraulic control system includes a 1-2 shift valve 24 for controlling flow of line pressure during shifting from the first speed to the second speed and for controlling the pressure conduit connected to friction members which are actuated during reverse driving and a 2-3/4-3 shift valve 26 actuated by line pressure and feeds releasing pressure to a second friction member C2 and actuating pressure to a third friction member C3.

Also, the hydraulic control system includes an end clutch valve 28 for feeding actuating pressure to a fourth friction member C4 and a fifth friction member actuated by pressure fed from the manual valve 14 at the reverse range.

Also, the hydraulic control system includes a 2-4/3-4 shift valve 30 for exhausting actuating pressure of the first friction member C1 during second-to-fourth, third-to-fourth and fourth-to-second speed shifting and for controlling a time duration of feeding pressure to the first friction member C1 during fourth-to-third speed shifting to prevent shift shock.

Figure 2:
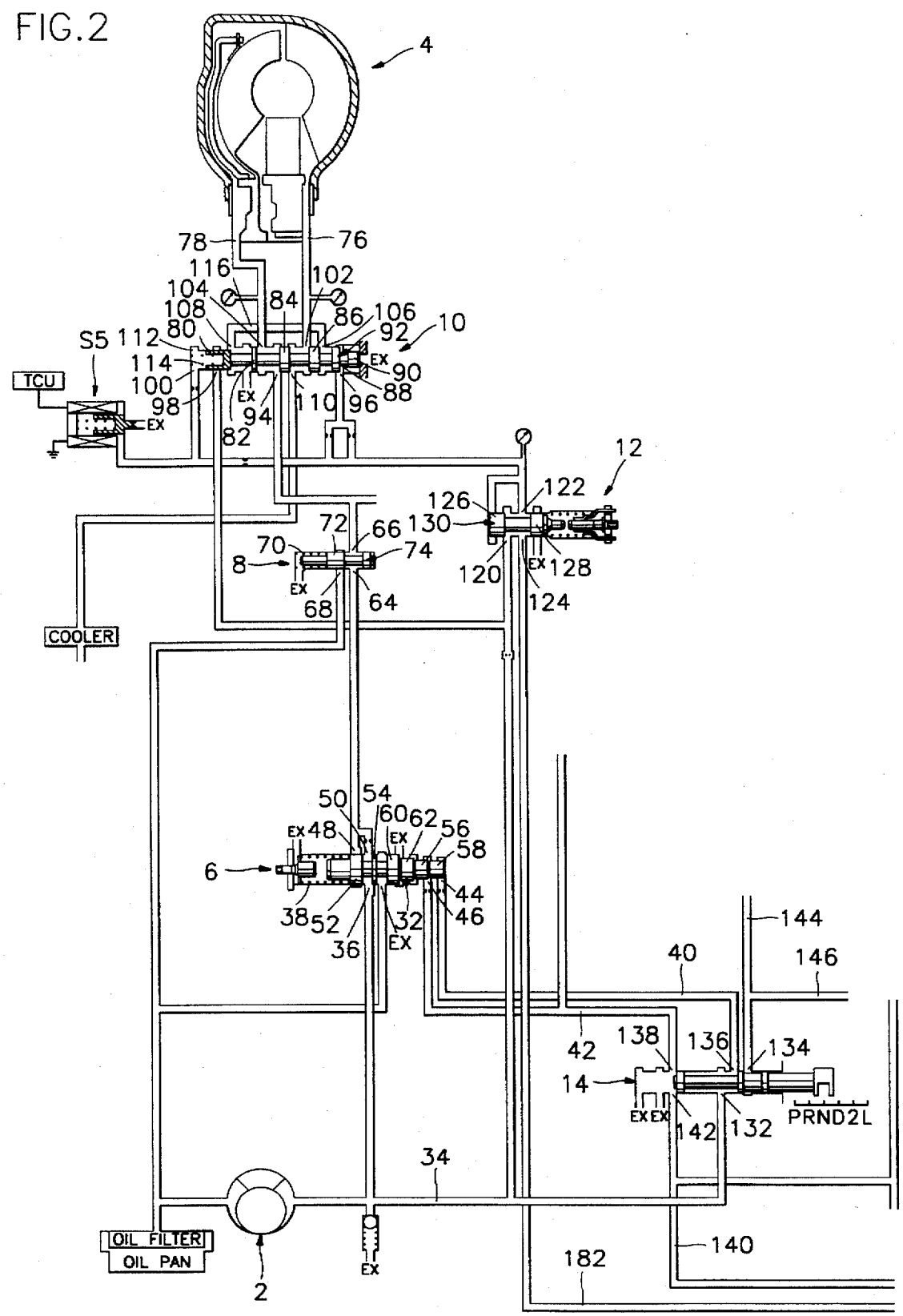
FIG. 2 is an enlarged view of the line pressure control section and the damper clutch control section of the system shown in FIG. 1.

FIG. 2 is a view showing a line pressure control section and a damper clutch control section wherein the hydraulic pump 2 and the torque converter 4 are constructed identically to those of conventional art and, therefore, are not described in detail here.

A pressure regulating valve 6 for adjusting line pressure from the hydraulic pump 2 has a valve body and a valve spool 32 disposed therein.

The valve body has a first port 36 connected to a line pressure conduit 34, a second port 44 connected to a line pressure conduit 40 through which pressure acting against a valve spring 38 is fed to the pressure regulating valve 6 via the manual valve 14, a third port 36 connected to a reverse pressure conduit 42, and fourth and fifth ports 48 and 50 which connect the first port 36 with a torque converter control valve 8.

The valve spool 32 biased by the spring 38 has a first land 52 for selectively closing the fourth port 48, a second land 54 for allowing line pressure exhausted when the valve spool 32 is displaced towards the left, third and fourth lands 56 and 58 on which pressure coming through the third and second ports 46 and 44 act, respectively, and fifth and sixth lands prepared between the second land 54 and the third land 56 for use when separate control means is added.

The torque converter control valve 8 connected between the pressure regulating valve 6 and a damper clutch control valve 10 includes a valve body having first, second and third ports 64, 66 and 68 and a valve spool 74 biased by a spring 70 and having a land 72 for feeding some fluids coming through the first port 64 to the third port 68.

The damper clutch control valve 10 is connected to the torque converter 4 via clutch actuating and releasing conduits 76 and 78 to actuate a damper clutch disposed within the torque converter.

The damper clutch control valve 10 includes a valve spool 92 having first through sixth lands 80, 82, 84, 86, 88 and 90 and a valve body having first through ninth ports 94, 96, 98, 100, 102, 104, 106, 108 and 110. A spring 114 disposed within a pressure chamber 112 at the front of the first land 80 to bias the valve spool 92 towards the right. The first port 94 is connected to the pressure regulating valve 6 to receive line pressure which is regulated, the third port 98 receives line pressure fed to a reducing valve 12, and the second port 96 receives pressure reduced by the reducing valve 12. The seventh port 106 is connected to the eighth port 108 via a conduit 116, and the fifth and six ports 102 and 104 are connected to the torque converter 4 through clutch actuating and releasing conduits 76 and 78, respectively.

The reducing valve 12 connected to a branch conduit 118 of a line pressure conduit 34 to feed reduced pressure to the damper clutch control valve 10 and a damper clutch control solenoid valve S5 includes a valve body having a first port 120 connected to the branch conduit 118, second and third ports 122 and 124 for feeding some fluids coming through the first port 120 to the damper clutch control valve 10 and the pressure control valves 18 and 20, respectively, and a valve spool 130 having first and second lands 126 and 128 for varying openings of these port.

The manual valve 14 includes a valve body having a first port 132, a second port 134 for feeding pressure coming through the first port 132 to a shift control valve 16 at the "D", "2" and "L" ranges, a third port 136 for feeding pressure to the pressure regulating valve 6 via a conduit 40 at the "N", "D", "2" and "L" ranges, a fourth port 138 for feeding pressure to the pressure regulating valve 6 and a fifth friction member C5 via a conduit 42 at the "R" range, and a fifth port 142 for feeding pressure to any one port of an N-R control valve 22 via a conduit 140 during a conversion from the "N" range to the "R" range.

Figure 3:
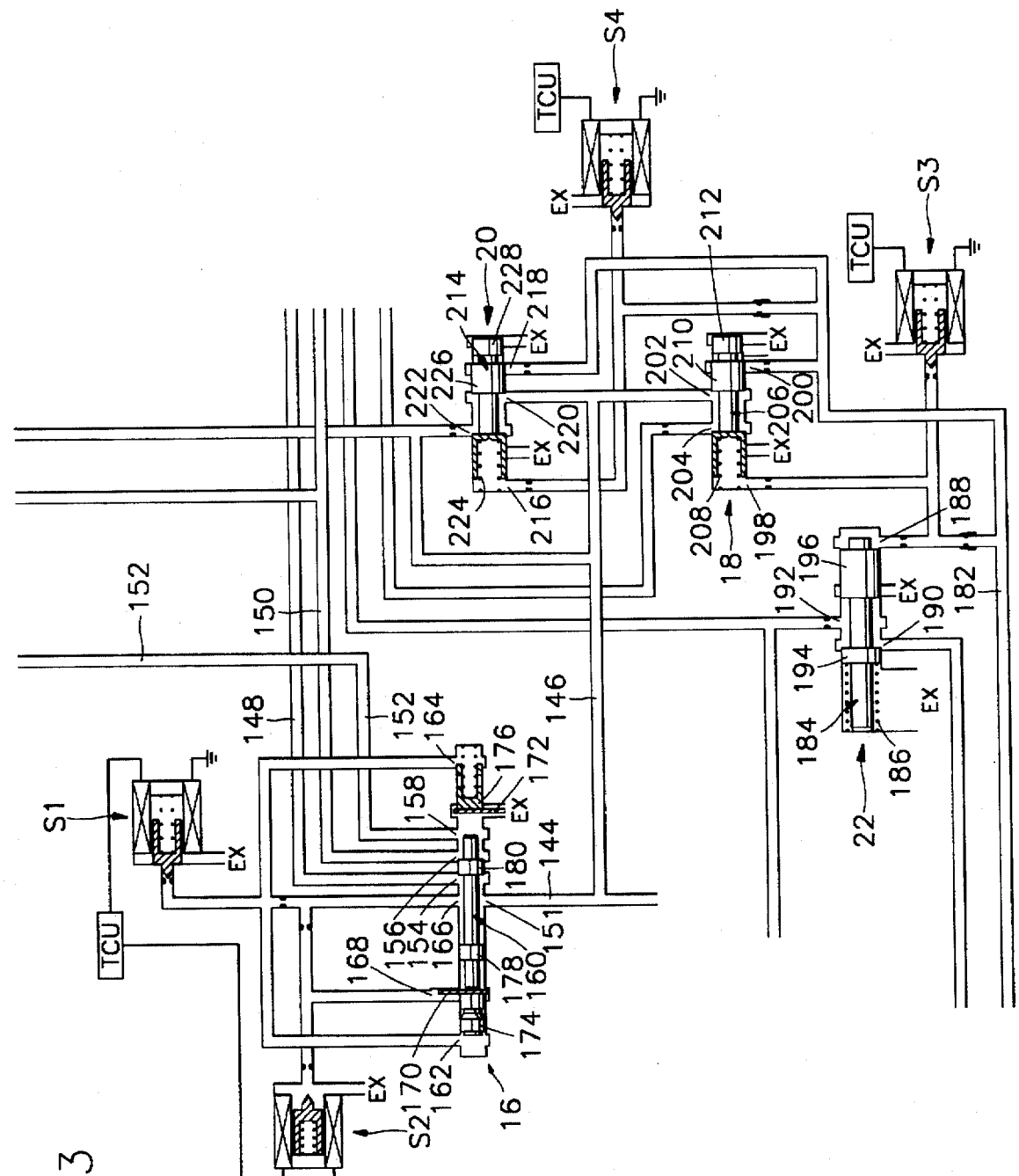
FIG. 3 is an enlarged view of the first shift control section of the system shown in FIG. 1.

Referring to FIG. 3 showing a first transmission control section according to the present invention, together with FIG. 1, pressure in a drive pressure conduit 144 connecting the manual valve 14 and the shift control valve 16 is selectively fed to a plurality of friction members by shift control solenoid valves S1 and S2 which are controlled to ON/OFF states by the TCU.

To selectively actuate these friction members, in the present embodiment, the drive pressure conduit 144 is directly connected to a first speed line 146, and the shift control valve 16 is connected to second, third and fourth speed lines 148, 150 and 152.

The shift control valve 16 includes a valve spool 160 and a valve body having a first port 153 connected to the drive pressure conduit 144, second, third and fourth ports 154, 156 and 158 connected to the second, third and fourth speed lines, respectively, fifth and sixth ports 162 and 164 for feeding pressure coming through the first port 153 to each side of the valve spool 160, respectively, to displace the valve spool 160 by the shift control solenoid valves S1 and S2. The fifth and sixth ports 162 and 164 are connected to a seventh port 166 which is connected to an eighth port 168 to displace the valve spool 160. Plugs 170 and 172 are disposed in the fifth and sixth ports 162 and 164, respectively, and these plugs are displaced towards the left and right according to the shift control solenoid valves S1 and S2 controlled to ON/OFF states. Displacements of the plugs 170 and 172 are restricted by stoppers 174 and 176 disposed at the eighth port 168 and an exhaust port Ex, respectively. The stoppers 174 and 176 are thin plates each having a center hole through which the left and right ends of the valve spool 160 is inserted. The valve spool 160 has a first land 178 and a second land 180 smaller than the first land 178, and the second land 180 selectively closes the second, third and the fourth ports 154, 156 and 158.

The N-R control valve 22 connected to a reduced pressure conduit 182 allows pressure fed to the friction members which are actuated during reverse driving is gradually increased to reduce shift shock and has a valve spool 184 displaced according to the first pressure control solenoid valve S3 which is controlled to ON/OFF states or controlled according to a duty ratio.

A spring 186 is disposed at the left of the valve spool 184 to bias the same towards the right. The N-R control valve 22 includes a valve body having a first port 188 connected to the reduced pressure conduit 182 to receive pressure controlled by the first pressure control solenoid valve S3, a second port 190 connected to the fifth port 142 of the manual valve 14 to receive line pressure, and a third port 192 for feeding pressure coming through the second port 190 to a 1-2 shift valve 24.

The valve spool 184 has a first land 194 on which pressure coming through the first port 188 acts and a second port 196 for selectively closing the second port 190. The reduced pressure conduit 182 is branched and connected to the first and second ports 198 and 200 of the first pressure control valve 18, and the first port 198 is connected to the first pressure control solenoid valve S3. Also, the first pressure control valve 18 has a third port 202 connected to the first speed line 146 and a fourth port 204 for feeding pressure coming through the third port 202 to the 1-2 shift valve 24.

A valve spool 206 of the first pressure control valve 18 biased by a spring 208 and has a first land 210 on which pressure coming through the first port 198 acts and a second land 212 on which pressure coming through the second port 200 acts.

A second pressure control solenoid valve S4 is disposed in a line connected to the second port 200 and controls a valve spool 214 of the second pressure control valve 20.

Pressure controlled by the second pressure control solenoid valve S4 is fed to the first port 216, and uncontrolled pressure is fed to the second port 218. Also, the second pressure control valve 20 has a third port 220 connected to the first speed line 146 of the shift control valve 16 and a fourth port 222 for feeding pressure coming through the third port 220 to the 2-4/3-4 shift valve 30. A valve spool 214 of the second pressure control valve 20 is biased by a spring 224 and has a first land 226 on which pressure coming through the first port 216 acts and a second land 228 on which pressure coming through the second port 218 acts.

Figure 4:
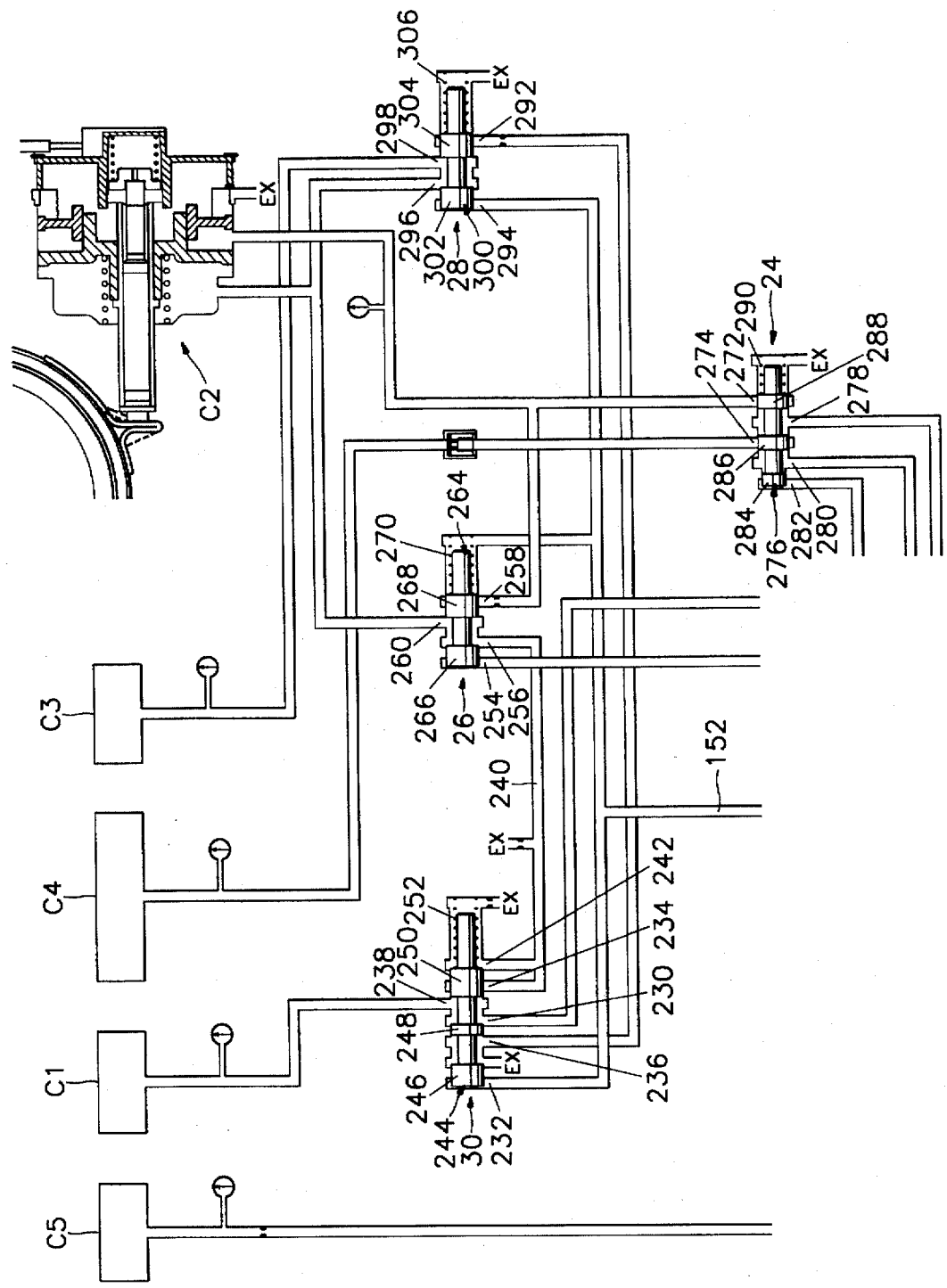
FIG. 4 is an enlarged view of the second shift control section of the system shown in FIG. 1.

Referring to FIG. 4 showing a second transmission control section according to the present invention, together with FIG. 1, pressure from the 2-4/3-4 shift valve 30 to which pressure is fed from the second pressure control valve 20, a 2-3/4-3 shift control valve 26, the 1-2 shift control valve 24 and an end clutch valve 28 is fed to or exhausted from a first friction member C1 (a rear clutch), a second friction member C2 (a kickdown servo), a third friction member C3 (an end clutch) and a fourth friction member C4 (a low/reverse brake).

The 2-4/3-4 shift valve 30 includes a valve body having a first port 230 connected to the second pressure control valve 20, a second port 232 connected to a fourth speed line 152 of the shift control valve 16, a third port 234 connected to the 2-3/4-3 shift valve 26, a fourth port 236 formed adjacent to the first port 230 and connected to the end clutch valve 28, a fifth port 238 connected to the first friction member C1, and a sixth port 242 connected to the third port 234 and a conduit 240 connected to the 2-3/4-3 shift valve 26. Also, this valve 30 includes a valve spool 244 having a first land 246 on which pressure coming through the second port 232 acts, a second land 248 for selectively allowing communication between the first and fifth ports 230 and 238 and a third land 250 for selectively allowing connection of the third and fifth ports 234 and 238, and the valve spool 252 is biased by a spring 252.

The 2-3/4-3 shift valve 26 includes a valve body having a first port 254 connected to a third speed line 150 of the shift control valve 16, a second port 256 connected to a third port 234 of the 2-4/3-4 shift valve 30 via a conduit 240 having an exhaust outlet Ex in the middle thereof, a third port 258 to which pressure from the 1-2 shift valve 24 is fed, a fourth port 260 for releasing the second friction member C2 at the third speed of the "D" range, and a fifth port 262 connected to a fourth speed line 152. Also, this valve 26 includes a valve spool 264 having a first land 266 on which pressure from the third speed line 150 acts and a second land 268 for selectively opening the third port 258, and the valve spool 264 is biased by a spring 270.

The 1-2 shift valve 24 includes a valve body having a first port 272 for feeding pressure to an actuating conduit of the second friction member at the second, third and fourth speeds of the "D" range, a second port 274 for feeding pressure to the fourth friction member C4 at the "L" and "R" ranges, a third port 278 connected to the fourth port 204 of the first pressure control valve 18 when the valve spool 276 is displaced by pressure from the second speed line 148, a fourth port 280 connected to the third port 192 of the N-R control valve 22, and a fifth port 282 connected to the second speed line 148.

Also, this valve 24 includes a valve spool 276 having a first land 284 on which pressure coming through the fifth port 282 acts, a second land 286 for selectively closing the second and fourth ports 274 and 280, and a third land 288 for selectively closing the first and the third ports 282 and 278, and the valve spool 276 is biased by a spring 290 at the right end thereof.

The end clutch valve 28 includes a valve body having first and second ports 292 and 294 connected to the 2-4/3-4 shift valve 30 and a fourth speed line 152 of the shift control valve 16, a third port 296 connected a fourth port 260 of the 2-3/4-3 shift valve 26, and a fourth port 298 connected to the third friction member C3. Also, this valve 28 includes a valve spool 300 having a first land 302 on which pressure from the second port 294 acts and a second land 304 for selectively closing the first port 292, and the valve spool 300 is biased by a spring 306 at the right end thereof.

Operation of the Hydraulic Control System

In the hydraulic control system according to the present invention, the TCU controls the solenoid valves to ON/OFF states or according to a duty ratio based upon the throttle valve opening and the vehicle speed. In turn, the solenoid valves control pressure through the various valves and ultimately to the friction members to operate gear shifting.

The engine (not shown) drives the torque converter 4 which drives the transmission input shaft (not shown) and the hydraulic pump 2. Pressure produced by the hydraulic pump 2 is directed to the pressure regulating valve 6, torque control valve 8, damper clutch control valve 10, reducing valve 12 and manual valve 14 along the line pressure conduit 34.

Pressure fed to the pressure regulating valve 6 is regulated as it comes through the first port 36, is fed to the torque converter control valve 8 through the fourth port 50, pushes the valve spool 32 towards the left (in the figures), and some fluids are fed from the exhaust port Ex back to an oil pan.

As line pressure is fed to the first port 120 of the reducing valve 12, the valve spool 126 is displaced to reduce the opening of the first port such that pressure lower than line pressure is produced from the second and third ports 122 and 124. This reduced pressure is fed to the damper clutch control valve 10, first and second pressure control valves 18 and 20 and N-R control valve 22.

First Speed Operation of the "D" Range

Figure 5:
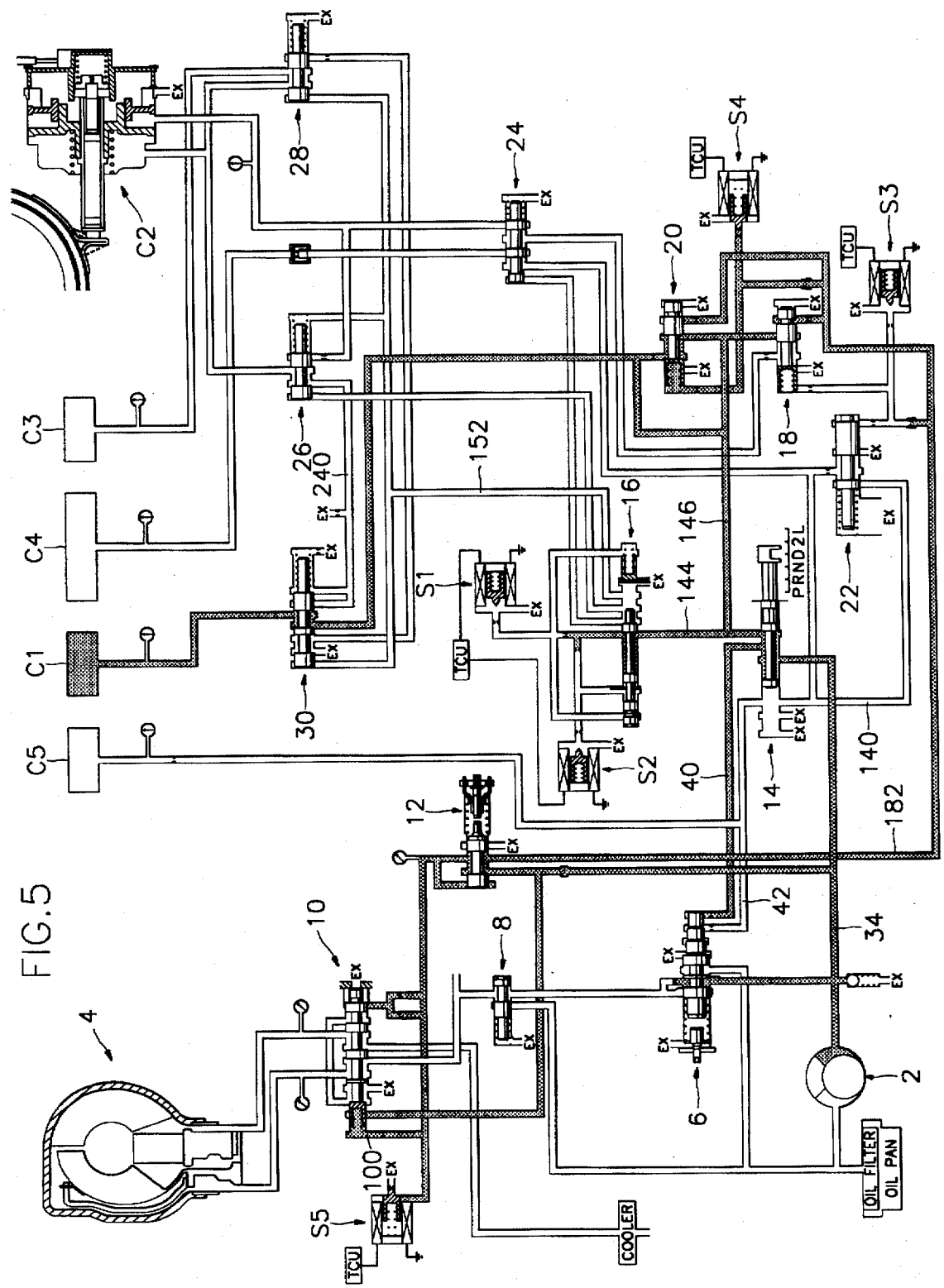
FIG. 5 is the hydraulic circuit diagram of FIG. 1 showing the operation of the control system during the first speed of the "D" range.

When the vehicle operator selects the "D" range of the shift select lever, the manual valve 14 interconnected with the shift select lever is changed from a state shown in FIG. 1 to that shown in FIG. 5. In FIG. 5, and also in FIGS. 6–16 described further herein, the shaded areas of the fluid lines represent lines in which fluids flow during the particular operation depicted by the circuit diagram. As shown in FIG. 5, pressure coming through the first port 132 and leaving through the second port 134 of the manual valve 14 is transmitted via the drive pressure conduit 144 to the first port 152 of the shift control valve 16 and the second ports 200 and 218 of the first and second pressure control valves 18 and 20, respectively.

Some fluids from the second port 136 of the manual valve 14 are fed to the second port 44 of the pressure regulating valve 6 to exert force on the right face of the fourth land 58.

During the first speed of the "D" range, the first and second shift control solenoid valves S1 and S2 are controlled to OFF and ON states, respectively, the first and second pressure control solenoid valves S3 and S4 are controlled according to duty ratios, and the damper clutch control solenoid valve S5 is controlled to an OFF state by the TCU. These solenoid valves are controlled in order to actuate only the first friction member C1 among the plurality of friction members to perform the first speed of the "D" range. The pressure feeding process to the first friction member C1 will now be explained with reference to FIG. 5.

Pressure adequate for speed shifting is fed to the drive pressure conduit 14 via the manual valve 14 by the pressure regulating valve 6. Because the first and second shift control solenoid valves S1 and S2 are controlled to ON states, pressure coming through the first port 152 of the shift control valve 16 is exhausted without establishing pressure in the fifth, sixth and eighth ports 162, 164 and 168.

Pressure on the right face of the first land 178 displaces the valve spool 160 until it is stopped by the stopper 170. The second land 180 is then positioned between the second port 154 and the fourth port 166. Therefore, drive pressure cannot be fed to the second, third and fourth speed lines 148, 150 and 152. Drive pressure is only applied to the first port 230 of the 2-3/3-4 shift valve 30 via the second pressure control valve 20 along the conduit 146 branched from the conduit 144.

Because pressure is not fed to the other ports of the 2-3/3-4 shift valve 30, the valve spool 238 is displaced towards the left in the figures by spring 252. Because the second land 248 is located to the left of the first port 230 and the third land 250 is located to the right of the fifth port 238, the first port 230 becomes connected with the fifth port 238 and pressure fed to the first port 230 is fed to the first friction member C1 to actuate the same and perform the shifting to the first speed.

During this first speed of the "D" range, the first pressure control solenoid valve S3 is controlled to an ON state. This causes pressure coming through the first port 198 of the first pressure control valve 18 to be released, and pressure coming through the second port 200 to act on the right face of the second land 210. The valve spool 206 is displaced towards the left causing the second land 210 to obstruct the third port 202 such that pressure coming to the third port 202 stops there.

Also, because the second pressure control solenoid valve S4 is controlled to an OFF state during the first speed of the "D" range, the valve spool 214 of the second pressure control valve 20 is displaced towards the right under the action of the force exerted by the spring 224 and pressure coming through the first port 216. Thus, pressure coming through the conduit 146 is fed to the 2-4/3-4 shift valve 30.

Second Speed Operation of the "D" Range

As vehicle speed and the throttle valve opening increases in the speed state, the TCU starts to control the first shift control solenoid valve S1 to an OFF state and the first pressure control solenoid valve S3 according to a duty ratio, as charted in FIG. 26.

Figure 6:
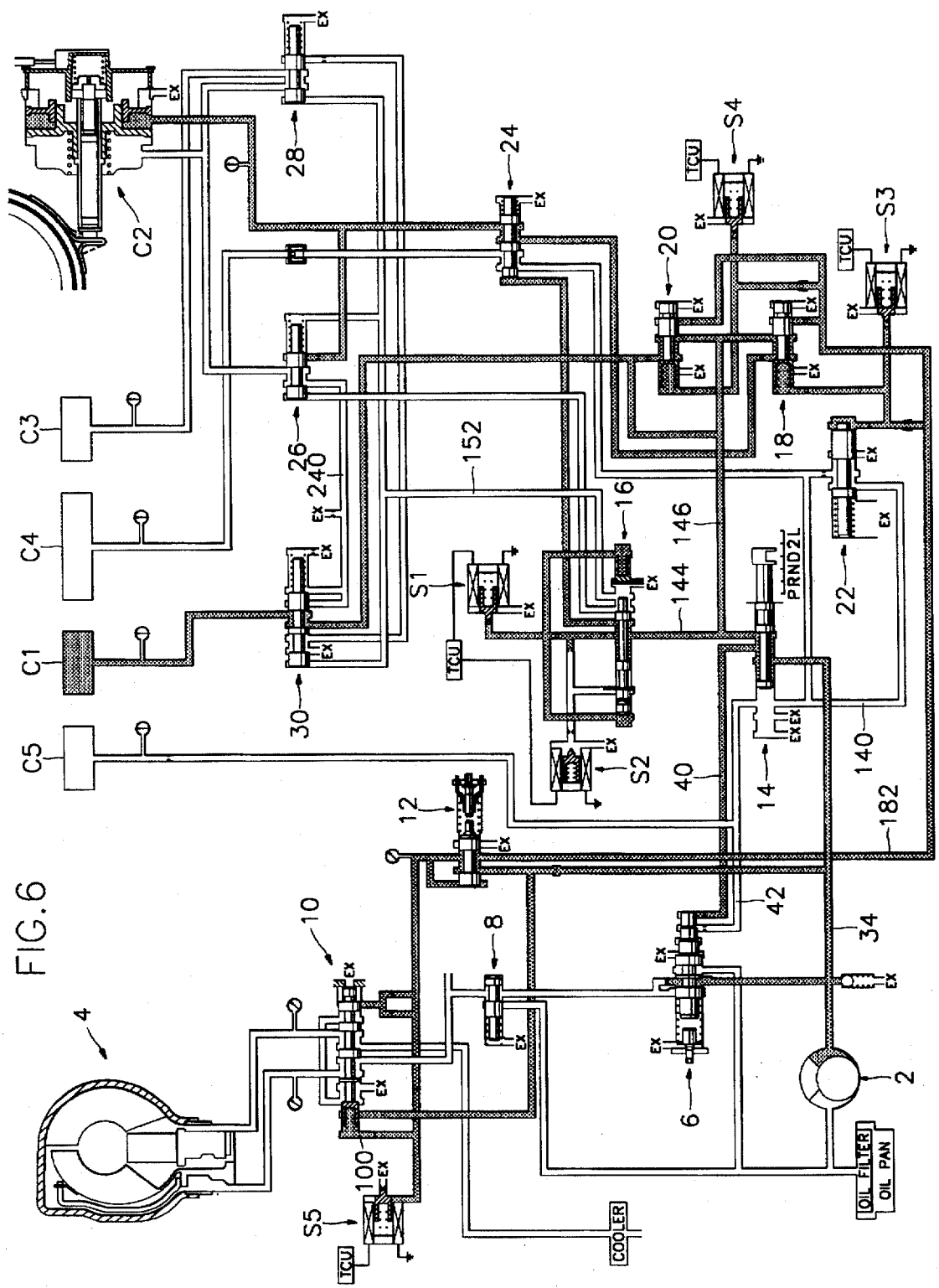
FIG. 6 is the hydraulic circuit diagram of FIG. 1 showing the operation of the control system during the second speed of the "D" ranges.

This control operates to perform the second speed of the "D" range. As the first shift control solenoid valve S1 is controlled to an OFF state, pressure established at the fifth and sixth ports 162 and 164 of the shift control valve 16 exerts forces to displace the plugs 174 and 176 to the positions limited by the stoppers 170 and 172, respectively, as shown in FIG. 6.

Accordingly, the valve spool 160 is slightly displaced towards the right by the plug 174 so that the second land 180 becomes located between the second port 154 and the third port 156 to connect the second speed line 148 with the first port 152.

As a result, some fluids flowing through the drive pressure conduit 144 are fed via the second speed line 148 to the fifth port 282 of the 1-2 shift valve 24 and exerts force on the valve spool 276. Pressure coming through the fifth port 282 of the 1-2 shift valve 24 exerts force on the left face of the first land 284 to displace the valve spool 276 towards the right.

Because the first pressure control solenoid valve S3 is controlled according to a duty ratio, pressure coming through the first port 198 of the first pressure control valve 18 increases gradually to displace the valve spool 206 towards the right. Accordingly, the third port 202 communicates with the fourth port 204 as the valve spool 206 of the first pressure control valve 18 is displaced from the left to the right, and pressure in the drive pressure conduit 146 is fed to the third port 278 of the 1-2 shift control valve 24. Because the valve spool 276 of the 1-2 shift control valve 24 is displaced towards the right, the third port 278 and the first port 272 are connected with each other so that drive pressure is fed to the second friction member C2 to actuate the same.

The second speed is accomplished because the first friction member C1 has been actuated since the first speed, and the first pressure control solenoid valve S3, which has been controlled by the TCU according to a duty ratio, is turned to an OFF state.

Third Second Operation of the "D" Range

Figure 7:
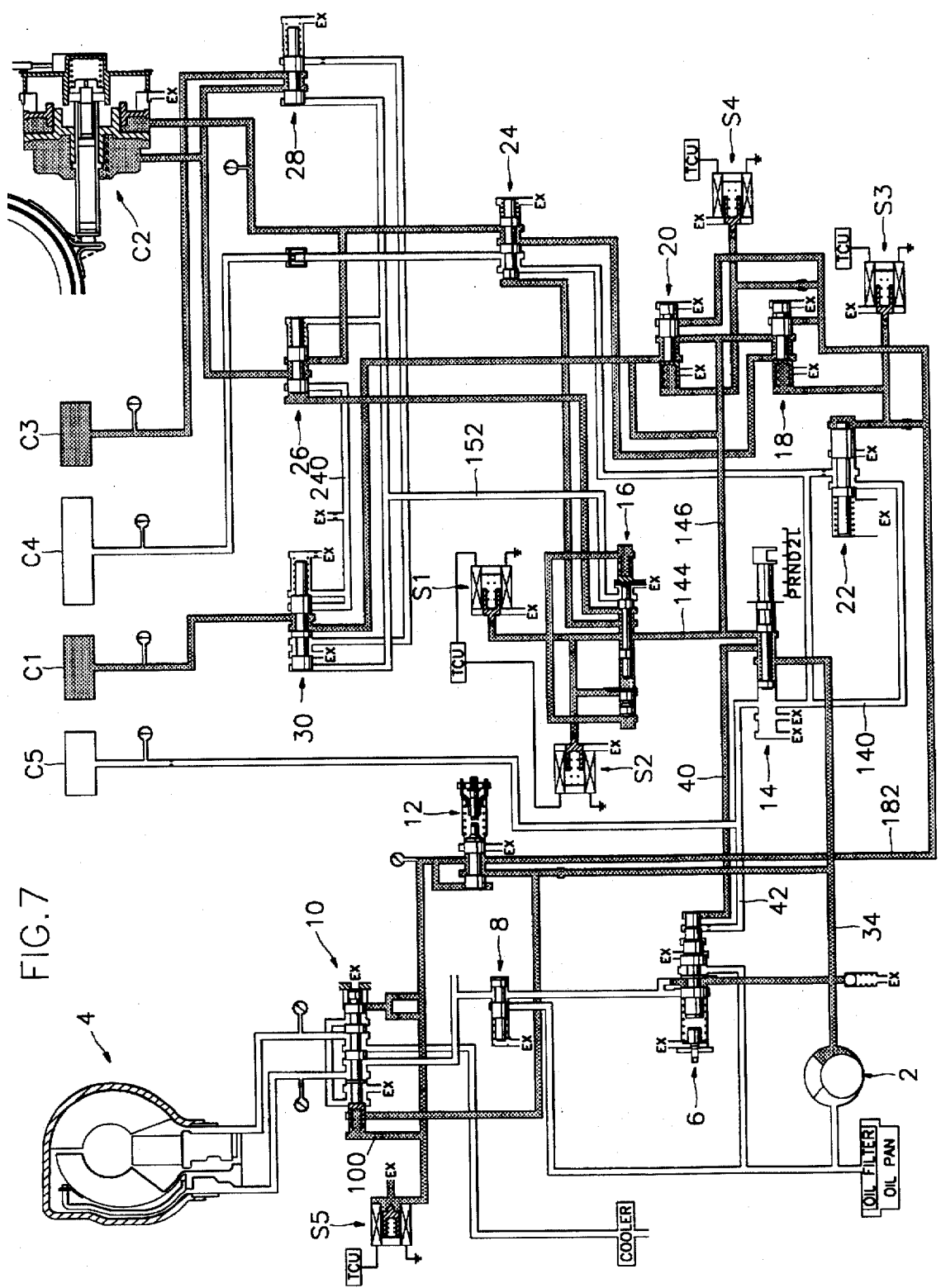
FIG. 7 is the hydraulic circuit diagram of FIG. 1 showing the operation of the control system during the third speed of the "D" range.

As the vehicle speed and the throttle valve opening increase further, the TCU starts to gradually control the second shift control solenoid valve S2 to an OFF state and the first pressure control solenoid valve S3 according to a duty ratio, as shown in FIG. 7.

Then, as the second shift control solenoid valve S2 is controlled to an OFF state at the second speed, pressure is established at the fifth, sixth and eighth ports 162, 164 and 168 of the shift control valve 16. The valve spool 160 is displaced to a position where it contacts the plug 176 by pressure acting on the left face of the first land 178. As a result, the second land 180 of the valve spool 160 becomes located between the third port 156 and the fourth port 158 to enable the second speed line 148 and the third speed line 150 to communicate with the first port 152.

As in the second speed operation, drive pressure coming through the first port 152 of the shift control valve 16 is fed to the 1-2 shift control valve 24 and the 2-3/4-3 shift valve 26. Because pressure from the third speed line 150 is fed to the first port 254 of the 2-3/4-3 shift valve 26, the valve spool 264 is displaced towards the right, and the third port 258 and the fourth port 260 become connected to each other. As such, drive pressure established in the third port 258 of the 2-3/4-3 shift valve 26 is fed to the releasing conduit of the second friction member C2. Some fluids are fed to the third port 296 of the end clutch valve 28 and actuates the third friction member C3 via the fourth port 298 to accomplish shifting to the third speed. During up-shifting from the second speed to the third speed, the second friction member C2 is released and the third friction member C3 is actuated under the action of pressure controlled by the first pressure control solenoid valve S3.

As the first and second shift control solenoid valves S1 and S2 are in OFF states in the third speed, the third speed state is used as an emergency mode when the TCU or electronic circuitry is malfunctioning.

Figure 18:
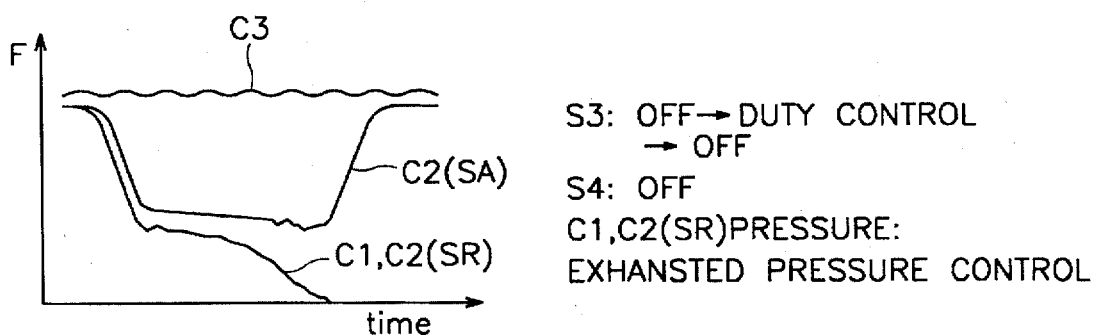
FIG. 18 is the hydraulic operation graph of the control system during third-to-fourth speed up-shifting at the "D" range.

During this shifting process, as shown in FIG. 18, the actuating of the first friction member C1 is continued under a constant pressure, the third friction member C3 is gradually fed with pressure from the moment pressure fed to the actuating conduit SA of the second friction member C2, and pressure in the actuating and releasing conduits SA and SR of the second friction member C2 is increased to accomplish the shifting to the third speed.

Fourth Speed Operation of the "D" Range

Figure 8:
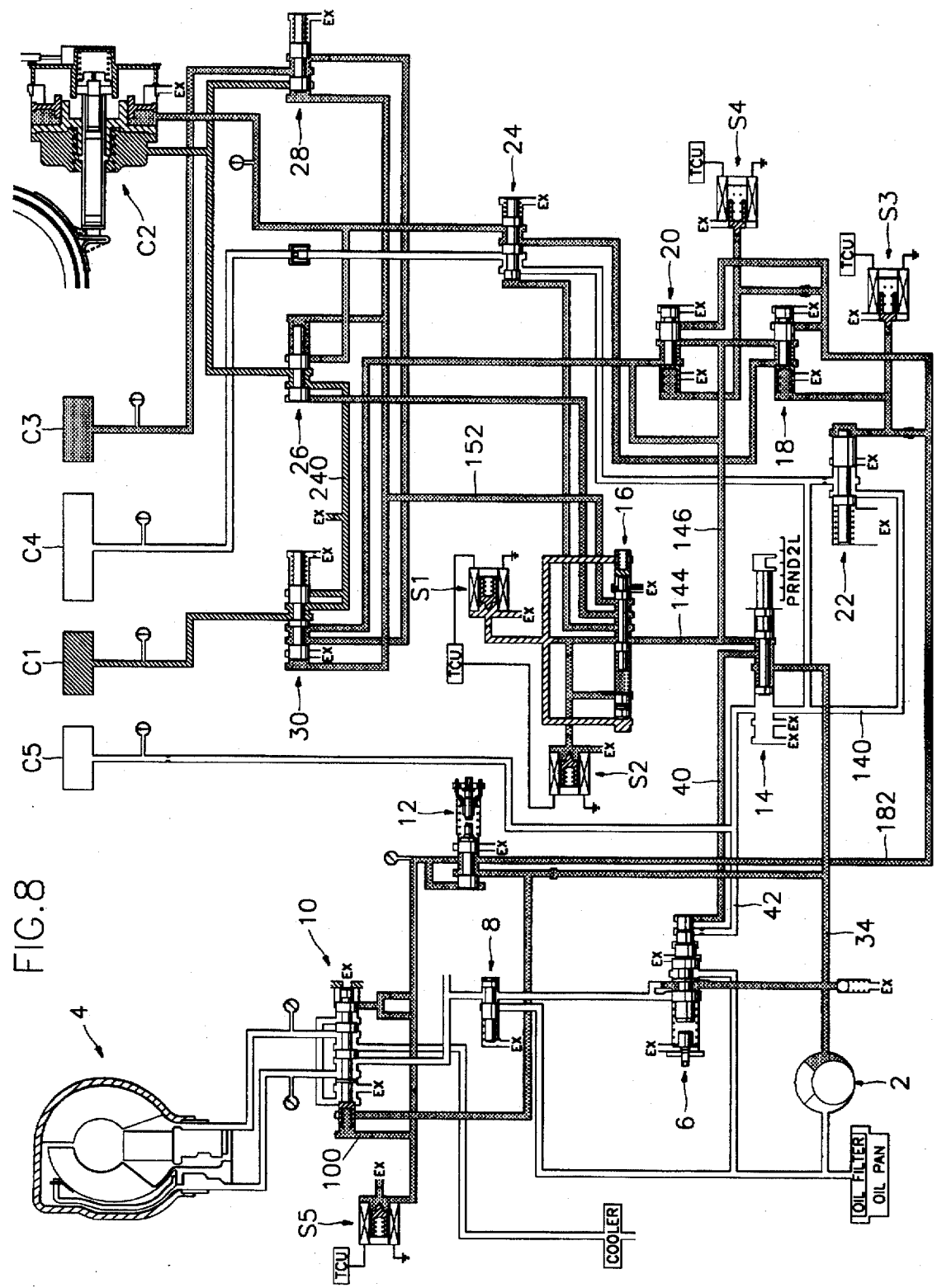
FIG. 8 is the hydraulic circuit diagram of FIG. 1 showing the operation of the control system during third-to-fourth speed up-shifting at the "D" range.

FIG. 8 diagrams the operation of the hydraulic control system during the shifting from the third speed to the fourth speed of the "D" range. As the vehicle speed and the throttle valve opening increase at the third speed, the TCU controls the first shift control solenoid valve S1 to an ON state and the first pressure control solenoid valve S3 according to a duty ratio.

Because pressure at the fifth and sixth ports 162 and 164 of the shift control valve 16 is released via the exhaust outlet of the first pressure control solenoid valve S3, and pressure at the eighth port 168 is not released, the valve spool 160 pushes the plug 176 and is fully displaced towards the right. Accordingly, drive pressure is fed to the second, third and fourth speed lines 148, 150 and 152 simultaneously. As pressure fed to the fourth speed line 152 is transmitted through the second port 232 of the 2-4/3-4 shift valve 30, the fifth port 262 of the 2-3/4-3 shift valve 26 and the second port 294 of the end clutch valve 28, the valve spools 244 and 300 of the 2-4/3-4 shift valve 30 and the end clutch valve 28 are displaced towards the right and valve spool 264 of the 2-3/4-3 shift valve 26 is displaced towards the left.

Figure 9:
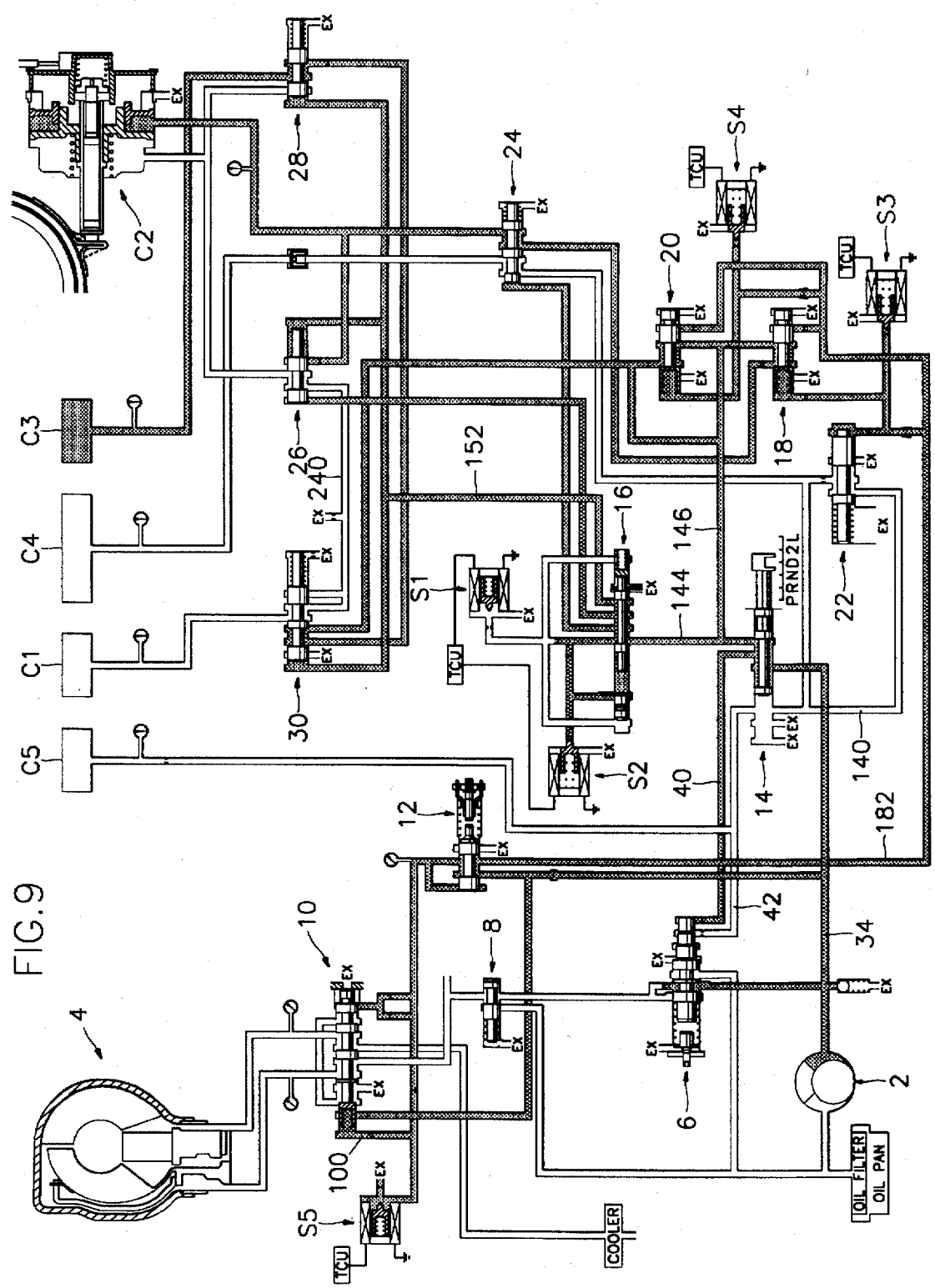
FIG. 9 is the hydraulic circuit diagram of FIG. 1 showing the operation of the control system during the fourth speed of the "D" range.

Then, pressure fed to the third friction member C3 from the 2-3/4-3 shift valve 26 is substituted by pressure fed to the end clutch valve via the 2-4/3-4 shift valve 30. The third port 234 and the fifth port 238 of the 2-4/3-4 shift valve 30 become connected to each other, and the second port 256 and the fourth port 260 of the 2-3/4-3 shift valve 26 become connected to each other. Thus, pressure fed to the releasing conduits of the first and second friction members C1 and C2 is exhausted through the exhaust outlet of the conduit 240 as indicated by hatched lines in FIG. 8, and the shifting to the fourth speed is accomplished as shown in FIG. 9.

During this shifting process, as shown in FIG. 18, the actuating of the third friction member C3 is continued under a constant pressure, pressure at the actuating conduit SA of the second friction member C2 is gradually decreased and, after this, the releasing conduits SR of the first and second friction members C1 and C2 are abruptly decreased. Pressure at the actuating conduit SA of the second friction member C2 is maintained for a predetermined period and increased thereafter, and the releasing conduits SR of the first and second friction members C1 and C2 are gradually decreased until pressure at the second friction member C2 begins increasing, abruptly decreased thereafter, and released.

As a result of these operations, the fourth speed is completed and the vehicle is driven at its maximum speed. During this shifting process, the damper clutch control solenoid valve S5 is controlled to ON/OFF states according to the torque converter control valve 8 and allows the torque converter 4 to be connected or disconnected with the engine.

Operation of Shifting from Fourth to Third Speed

Figure 10:
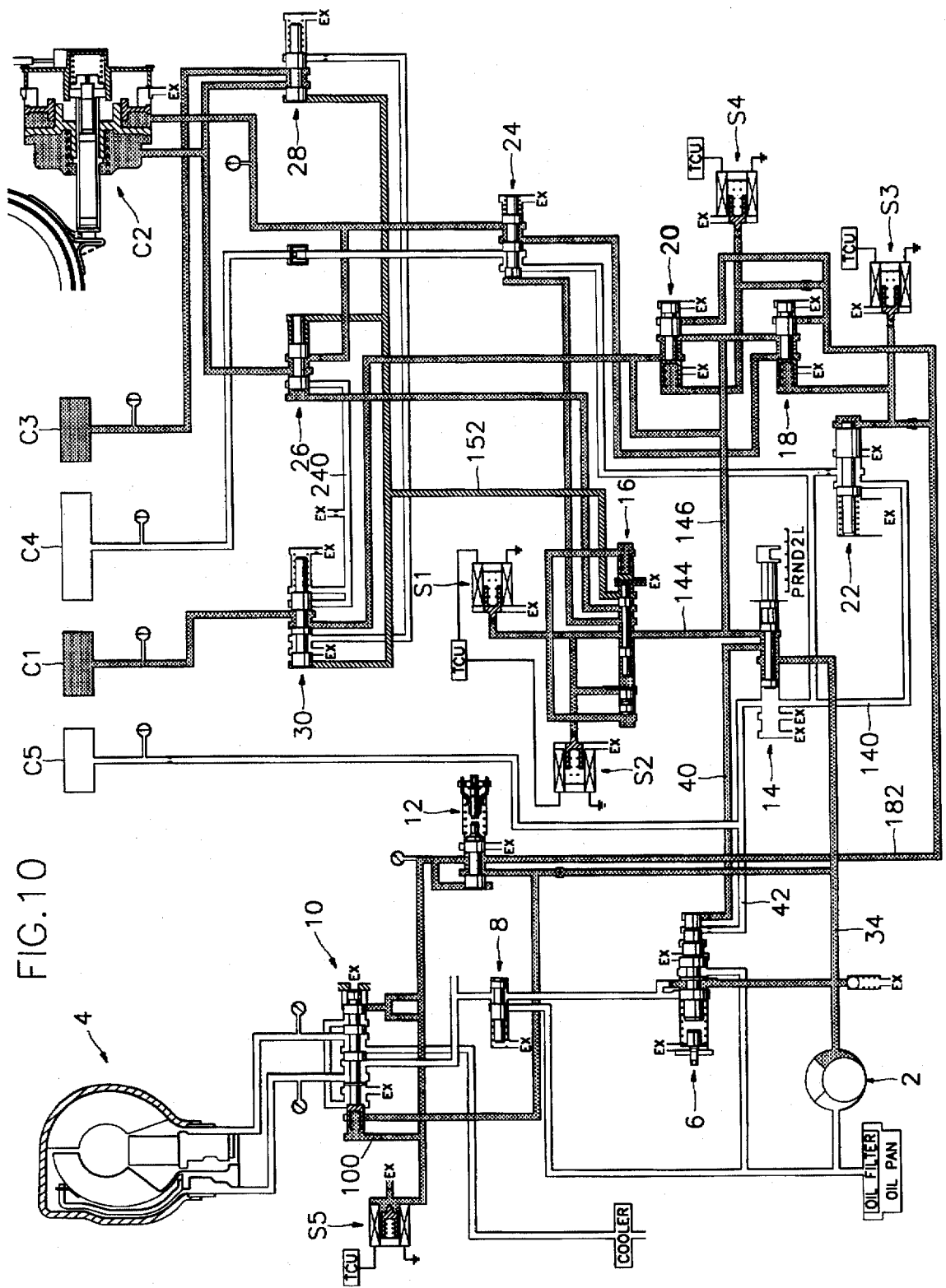
FIG. 10 is the hydraulic circuit diagram of FIG. 1 showing the operation of the control system during fourth-to-third down-shifting at the "D" range.

FIG. 10 diagrams the operation of the hydraulic control system according to the present invention during downshifting or kickdown shifting from the fourth speed to the third speed wherein the first friction member C1 should be actuated and pressure should be fed to the releasing conduit of the second friction member C2 at the fourth speed state. Accordingly, the first shift control solenoid valve S1 is controlled to an OFF state, the second shift control solenoid valve S2 to an ON state, and the first and second pressure control solenoid valves S3 and S4 according to duty ratios.

Then, pressure is established at the fifth and sixth ports 162 and 164 of the shift control valve 16 and pressure at the eighth port 168 is released. As the valve spool 160 is displaced towards the left to obstruct pressure to the fifth speed line 152, the force biasing the valve spools 238 and 290 of the rear clutch release valve 30 and the end clutch valve 28 are released and these valve spools 238 and 290 are displaced towards the left under the action of springs 244 and 296. Then, the fourth port 158 of the shift control valve 16 which is connected to the fourth speed line 152 becomes connected with the exhaust outlet, and pressure fed to the 2-4/3-4 shift valve 30, 2-3/4-3 shift valve 26 and end clutch valve 28 via the fourth speed line 152 is released as indicated by hatched lines in FIG. 10. The valve spools 244 and 300 of the 2-4 shift valve 30 and the end clutch valve 28 are displaced towards the left, and the valve spool 264 of the 2-3/4-3 shift valve 26 is displaced towards the left by third speed pressure. Accordingly, pressure is fed to the first friction member C1 via the 2-4/3-4 shift valve 30, and the third port 296 and the fourth port 298 of the end clutch valve 28 become connected to each other to feed pressure to the releasing conduit of the second friction member C2. The shifting to the third speed is accomplished as the first friction member C1 becomes actuated in a state the third friction member C3.

Figure 19:
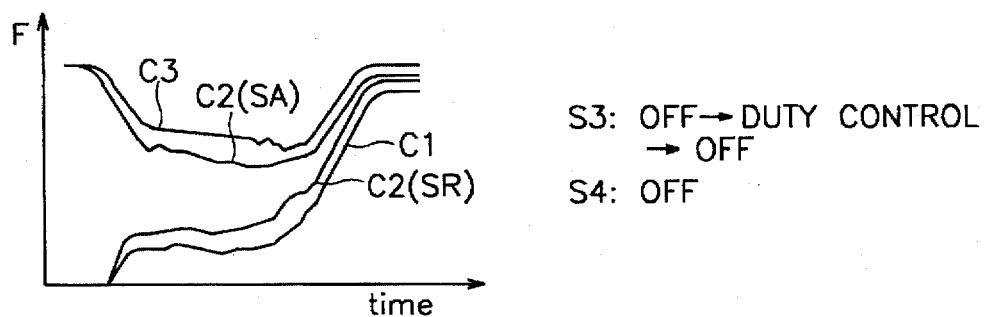
FIG. 19 is the hydraulic operation graph of the control system during fourth-to-third down-shifting at the "D" range.

During this shifting process, as shown in FIG. 19, pressure at the actuating conduits SA of the third and second friction members C3 and C2 is once decreased and then increased by the duty-control of the first pressure control solenoid valve S3. Pressure at the actuating conduit SA of the second friction member C2 and the first friction member C1 is abruptly increased a little from the moment pressure at the actuating conduits SA of the third and second friction members C3 and C2 is decreased, maintained for a predetermined period thereafter, and abruptly increased again. As a result, the second friction member C2 is released and the first and third friction members C1 and C3 are actuated.

Operation of Kickdown Shifting from Fourth to Second Speed of "D" Range

Figure 11:
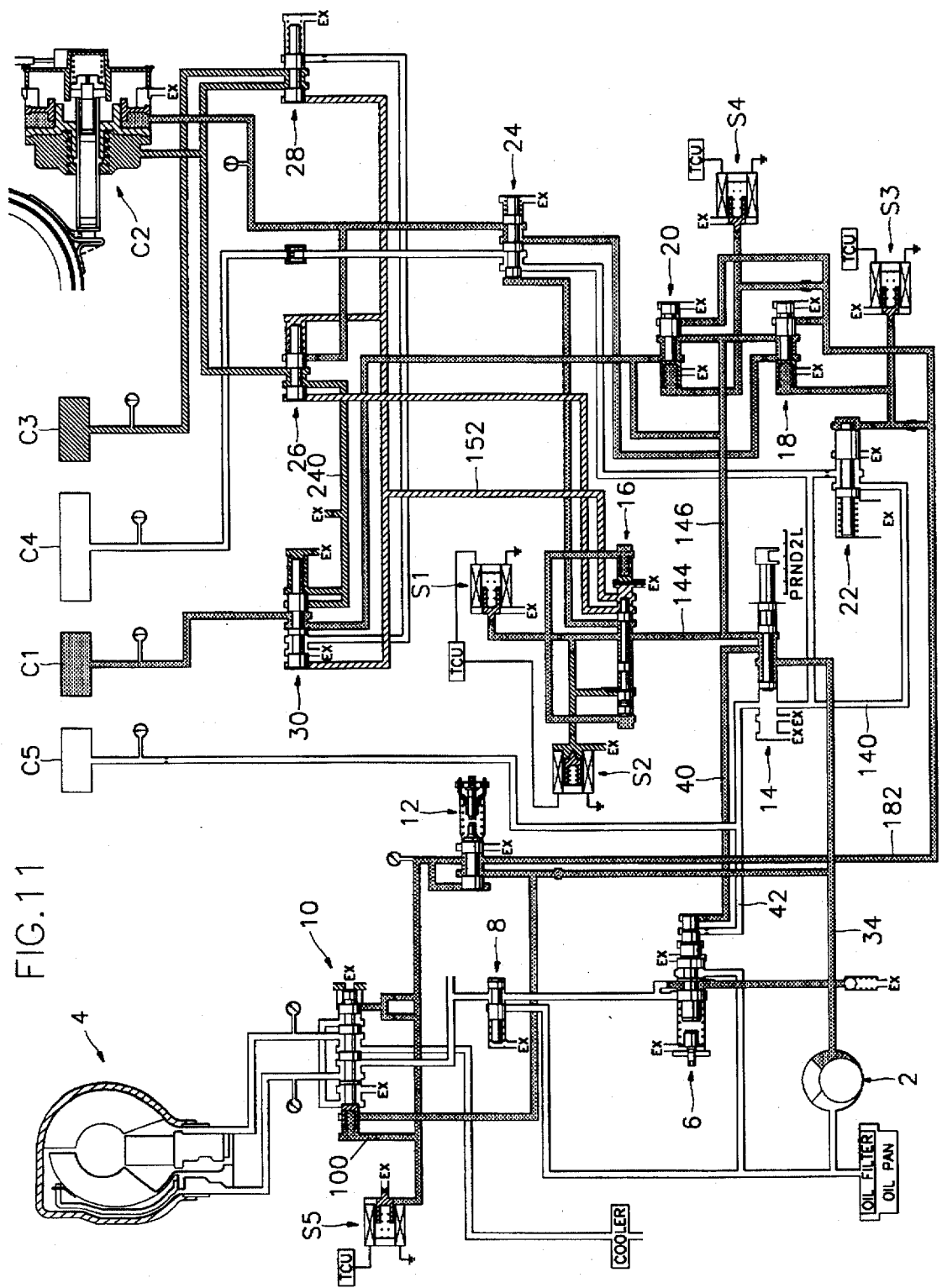
FIG. 11 is the hydraulic circuit diagram of FIG. 1 showing the operation of the control system during fourth-to-second skip shifting at the "D" range.

FIG. 11 diagrams the operation of the hydraulic control system according to the present invention during kickdown shifting from the fourth speed to the second speed wherein the third friction member C3 should be released and the second friction member C2 should be actuated at the fourth speed state. Accordingly, the TCU controls the first shift control solenoid valve S1 to an OFF state, and the second shift control solenoid valve S2 to an ON state. Also, the first and second pressure control solenoid valves S3 and S4 are controlled according to duty ratios and the damper clutch control solenoid valve S5 is controlled to an OFF state to increase line pressure.

Then, pressure fed to the eighth port 168 of the shift control valve 16 is exhausted through the exhaust outlet of the second shift control solenoid valve S2 as indicated by hatched lines in FIG. 11 and the valve spool 160 is displaced towards the left as shown in FIG. 11. By the valve spool 160, pressure fed to the third and fourth speed lines 150 and 152 is obstructed, and pressure of the these lines 150 and 152 is released through the exhaust outlet. As a result, pressure fed to the 2-4/3-4 shift valve, 2-3/4-3 shift valve and end clutch valve 30, 26 and 28 is released and the valve spools 244, 264 and 300 of these valves are displaced towards the left as in FIG. 11. Also, the 2-3/3-4 shift valve 30 allows the first port 230 and the fifth port 238 to be connected to each other to fed pressure from the first port 230 to the first friction member C1 and actuate the same.

As the third port 296 and the fourth port 298 of the end clutch valve 28 become connected to each other, pressure fed to the releasing conduit of the second friction member C2 and the third friction member C3 is exhausted through the exhaust outlet of the conduit 240. Therefore, the second friction member C2 is actuated and the third friction member C3 is released to perform the skip shifting to the second speed.

Figure 20:
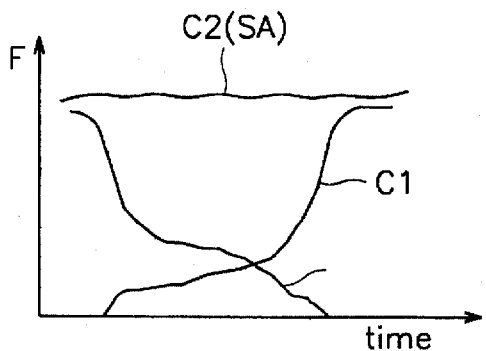
FIG. 20 is the hydraulic operation graph of the control system during fourth-to-second skip shifting at the "D" range.

During this shifting process, as shown in FIG. 20, pressure of the third friction member C3 begins to be decreased and released while pressure of the actuating conduit SA of the second friction member C2 is maintained constant, and pressure of the first friction member C1 is increased. Here, the orifice allows a time lag in releasing the third friction member C3.

Operation of Ski Shifting from Fourth to First Speed of "D" Range

Figure 12:
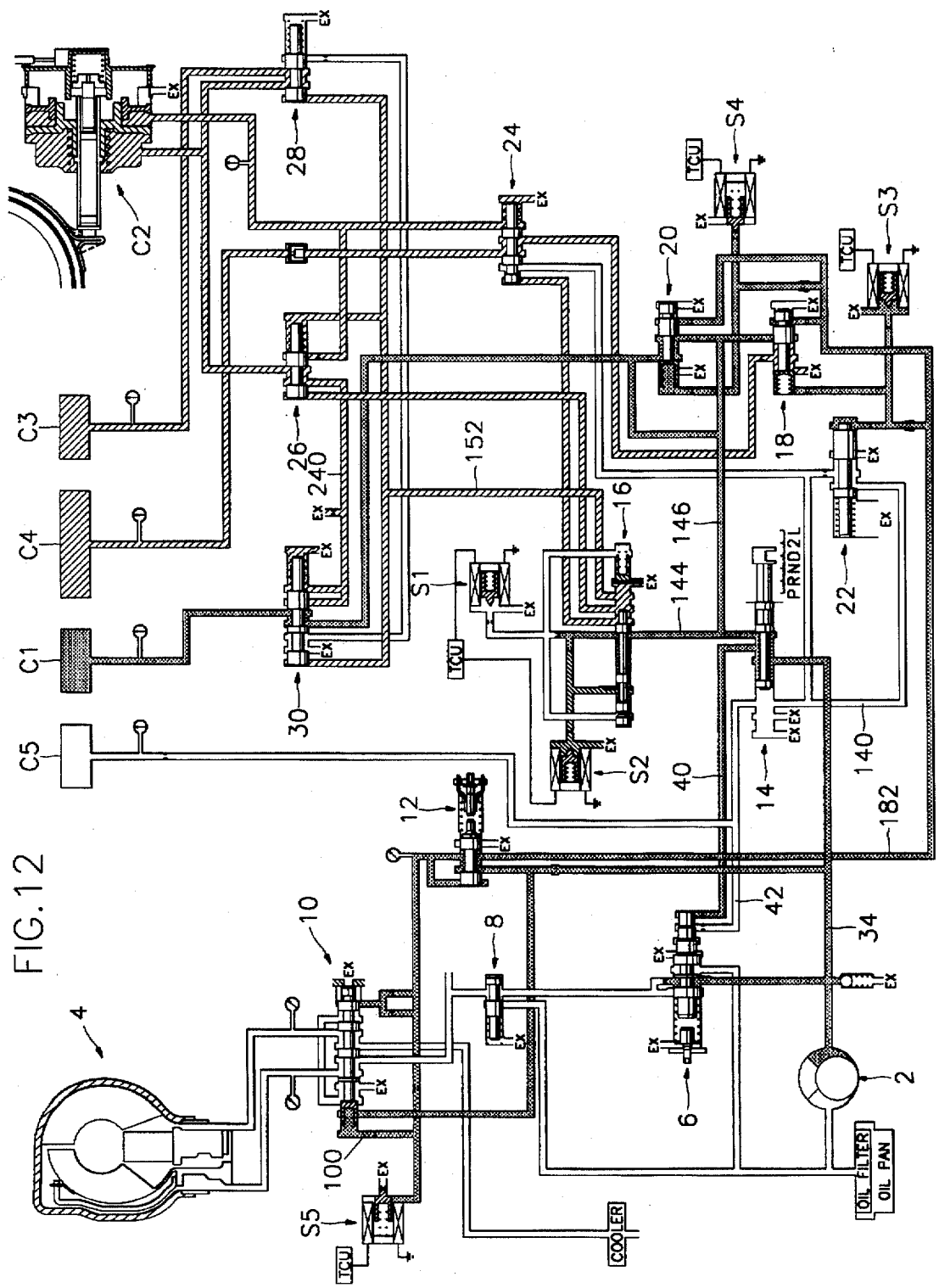
FIG. 12 is the hydraulic circuit diagram of FIG. 1 showing the operation of the control system during fourth-to-first skip shifting at the "D" range.

FIG. 12 diagrams the operation of the hydraulic control system according to the present invention during skip shifting from the fourth speed to the first speed wherein the second and third friction members C2 and C3 should be released and the first friction member C1 should be actuated at the fourth speed state. Accordingly, the TCU controls the first and second shift control solenoid valves S1 and S2 to ON states, the first pressure control solenoid valve S3 to an OFF state, and the second pressure control solenoid valve S4 according to a duty ratio.

Then, pressure fed to the eighth port 168 of the shift control valve 16 is exhausted through the exhaust outlet of the second shift control solenoid valve S2 as indicated by hatched lines in FIG. 12. The valve spool 160 is displaced to obstruct pressure fed to the second, third and fourth speed lines 148, 150 and 152, and pressure is exhausted through the exhaust outlet as shown in FIG. 12. Accordingly, pressure fed to the 2-4/3-4 shift valve 30, 2-3/4-3 shift valve 26 and end clutch valve 28 is released and the valve spools 244, 264 and 300 of these valves are displaced towards the left. Thus, the 2-3/4-3 shift valve 30 allows the first port 230 and the fifth port 238 to become connected to each other to feed pressure from the first port 230 to the first friction member C1 which is actuated thereby.

As the third port 296 and the fourth port 298 of the end clutch valve 28 become connected to each other, pressure fed to the releasing conduit of the second friction member C2 and the third friction member C3 is exhausted through the exhaust outlet of the conduit 240, and pressure which actuated the second friction member C2 is exhausted through the 1-2 shift valve 24. Thus, the first friction member C1 is actuated and the skip shifting to the first speed is accomplished.

Figure 21:
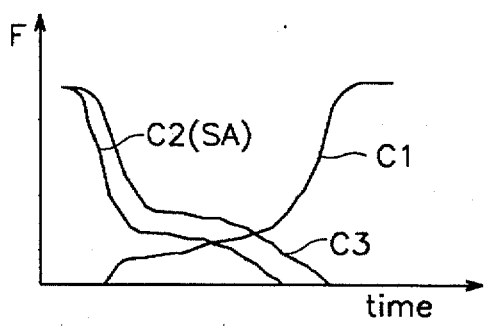
FIG. 21 is the hydraulic operation graph of the control system during fourth-to-first skip shifting at the "D" range.

During this shifting process, the third friction member C3 is released after the second friction member C2 begins releasing. As shown in FIG. 21, the first friction member C1 is actuated at the moment the second friction member C2 is released. Here, the orifice allows a time lag in releasing the third friction member C3.

Figure 13:
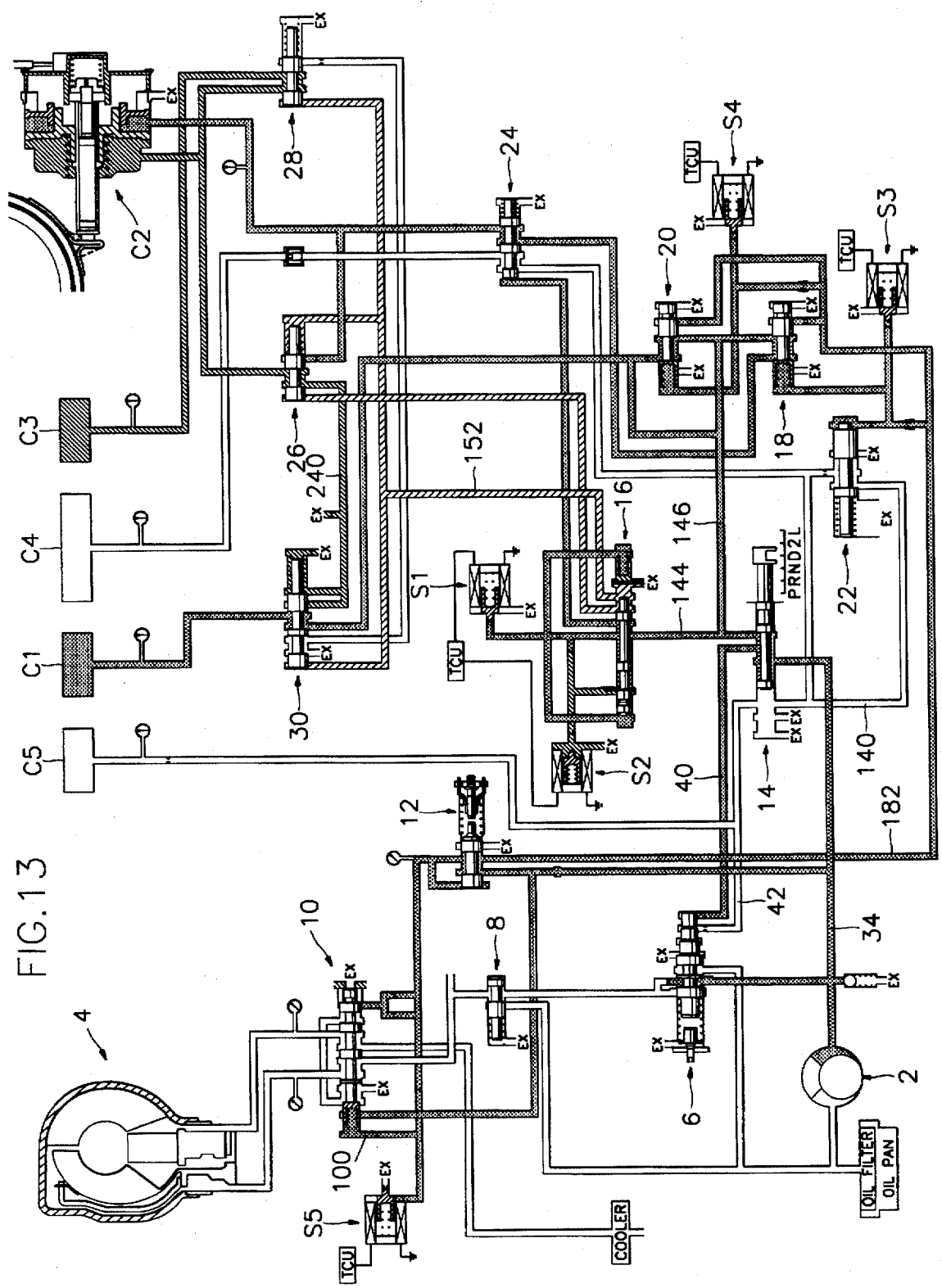
FIG. 13 is the hydraulic circuit diagram of FIG. 1 showing the operation of the control system during third-to-second down-shifting at the "D" range.

Operation of Down Shifting and Kickdown Shifting from Third Seed to Second Speed of the "D" Range FIG. 13 diagrams the operation of the hydraulic control system according to the present invention during down shifting and kickdown shifting from the third speed to the second speed wherein the third friction member C3 should be released and the second friction member C2 should be actuated at the third speed state. Accordingly, the TCU controls the first shift control solenoid valve S1 to an OFF state, the second shift control solenoid valve S2 to an ON state, the first pressure control solenoid valve S3 according to a duty ratio, the second pressure control solenoid valve S4 to an OFF state, and the damper clutch control solenoid valve S5 to an OFF state to increase line pressure.

Then, pressure fed to the eight port 168 of the shift control valve 16 is exhausted through the exhaust outlet of the second shift control solenoid valve S2 as indicated by hatched lines in FIG. 13. The valve spool 160 is displaced towards the left to obstruct pressure fed to the third speed line 150 as shown in FIG. 13. Accordingly, pressure fed to the 2-3/4-3 shift valve 26 is released and the valve spool 264 of this valve is displaced towards the left. Thus, the fourth port 260 and the second port 256 become connected to each other to exhaust pressure fed to the releasing conduit of the second friction member C2 and the third friction member through the exhaust outlet of the conduit 248 as indicated by hatched lines in FIG. 13. Accordingly, the second friction member C2 is actuated and the third friction member C3 is released to accomplish the skip shifting to the second speed.

Figure 22:
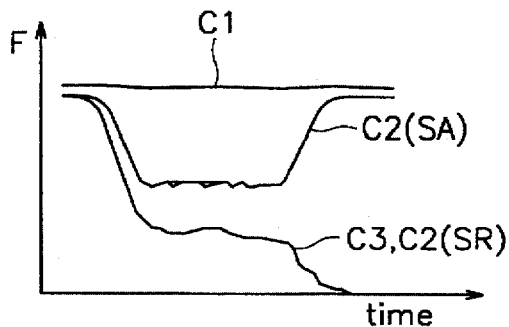
FIG. 22 is the hydraulic operation graph of the control system during third-to-second down-shifting at the "D" range.

During this shifting process, the actuating conduit SA of the second friction member C2 begins decreasing while actuating of the first friction member C1 is continued by constant pressure as shown in FIG. 22. Before pressure at the actuating conduit SA of the first friction member C1 decreases, pressure at the third friction member C3 and the releasing conduit of the second friction member C2 abruptly decreases. Pressure at the actuating conduit SA of the second friction member C2 is maintained for a predetermined period and increased thereafter, and pressure at the third friction member C3 and the releasing conduit SR of the second friction member C2 is completely exhausted before pressure at the second friction member C2 increases.

Operation of Lift Foot Up Shifting from Second to Fourth Speed of "D" Range

Figure 14:
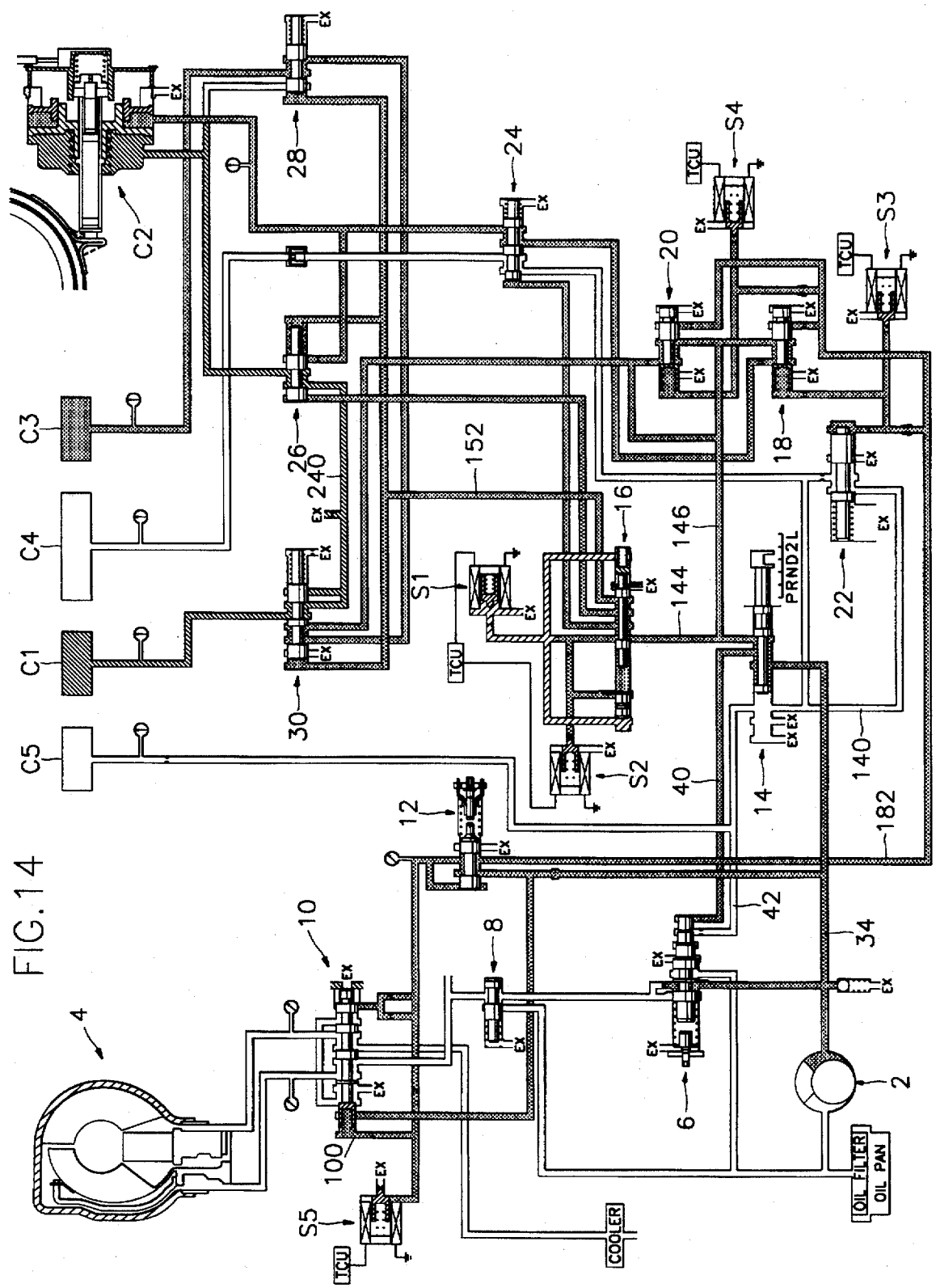
FIG. 14 is the hydraulic circuit diagram of FIG. 1 showing the operation of the control system during second-to-fourth lift foot up at the "D" range.

FIG. 14 diagrams the operation of the hydraulic control system according to the present invention during put-up lift shifting from the second speed to the fourth speed wherein the first friction member C1 should be released and the third and second friction members should be actuated. Accordingly, the TCU controls the first shift control solenoid valve S1 to an OFF state, the second shift control solenoid valve S2 to an ON state, the first pressure control solenoid valve S3 to an OFF state, and the second pressure control solenoid valve S4 according to a duty ratio.

Then, the shift control valve 16 feeds pressure to the second, third and fourth speed lines 148, 150 and 152 to control the 2-4/3-4 shift valve 30, 2-3/4-3 shift valve 26 and end clutch valve 28. Accordingly, pressure controlled by the second pressure control solenoid valve S2 is fed to the third friction member C3 via the 2-4/3-4 shift valve 30 and the end clutch valve 28, and actuating pressure of the first friction member C1 is exhausted through the 2-4/3-4 shift valve 30 as indicated by hatched lines in FIG. 14 while the second friction member C2 is kept actuated as shown in FIG. 14.

Figure 23:
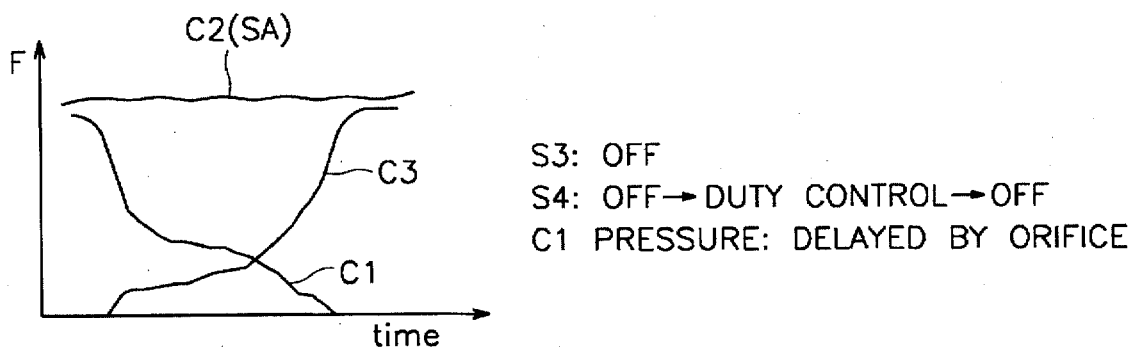
FIG. 23 is the hydraulic operation graph of the control system during second-to-fourth lift foot up at the "D" range.

During this shifting process, as shown in FIG. 23, actuating pressure at the first friction member C1 begins to become exhausted while pressure at the actuating conduit SA of the second friction member C2 is maintained constant, and actuating pressure at the third friction member C3 is abruptly increased and gradually increased thereafter to perform the shifting. Here, the orifice allows a time lag in releasing the first friction member C1.

"L" Range Operation

Figure 15:
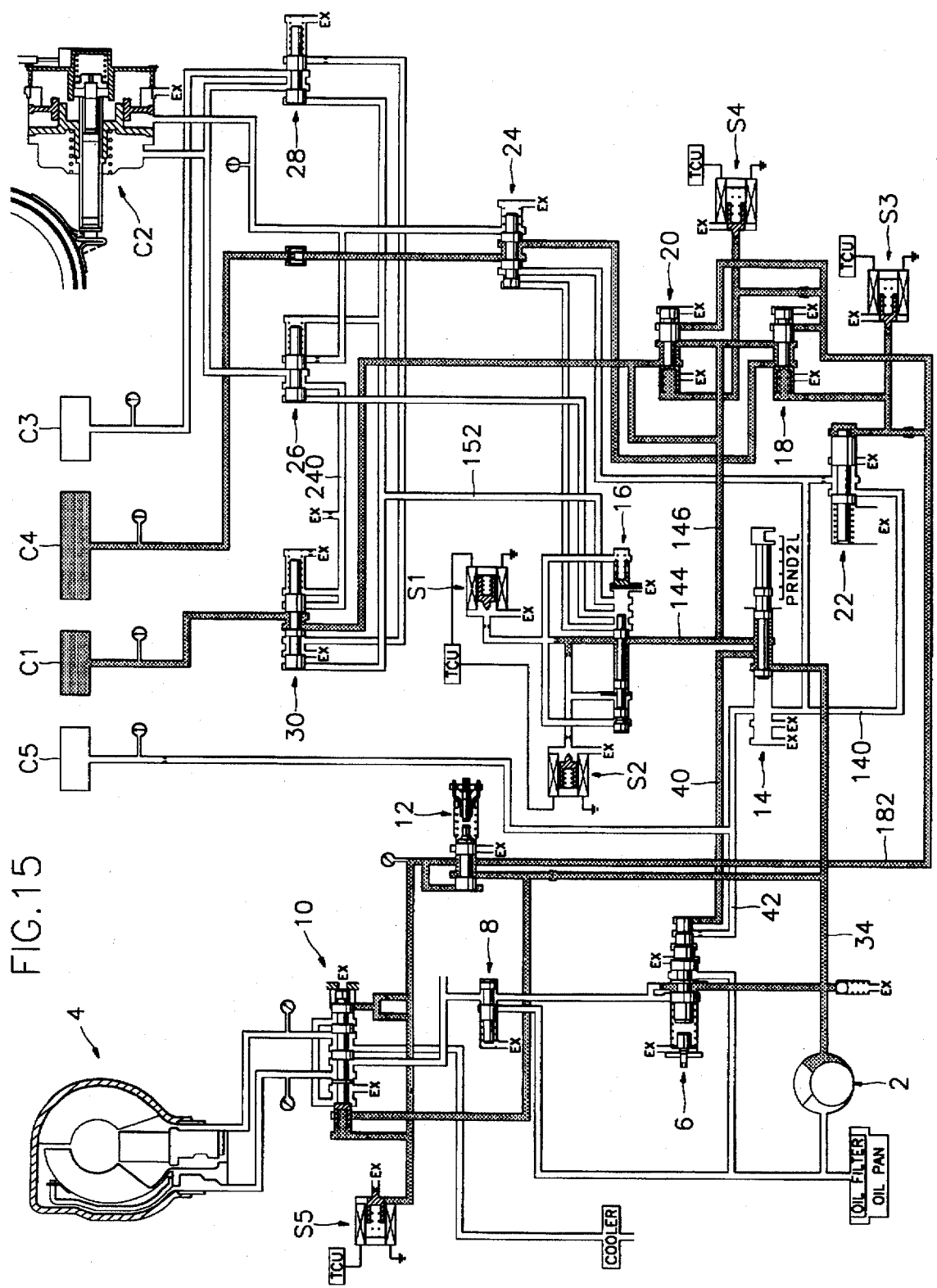
FIG. 15 is the hydraulic circuit diagram of FIG. 1 showing the operation of the control system during an "L" range.

FIG. 15 diagrams the operation of the hydraulic control system according to the present invention during shifting at the "L" range wherein the first and second shift control solenoid valves S1 and S2 are controlled to ON states, the first pressure control solenoid valve S3 is controlled according to a duty ratio, and the second pressure control solenoid valve S4 is controlled to an OFF state.

Accordingly, while pressure from the manual valve 14 is fed to the shift control valve 16 via the drive pressure conduit 144, pressure is not fed to the other valves according to the first and second shift control solenoid valves S1 and S2 which are controlled to ON states and pressure is fed to the third ports 202 and 220 of the first and second pressure control valves 18 and 20 via a branch conduit 146.

Then, the valve spools 206 and 214 of the first and second pressure control valves 18 and 20 are displaced towards the right by the first pressure control solenoid valve S3 which is controlled according to a duty ratio and the second pressure control solenoid valve S4 which is controlled to an OFF state. Thus, the third ports 202 and 220 and the fourth ports 204 and 222 of these valves become connected to each other, respectively to feed pressure to the 1-2 shift valve 24 and the 2-4/3-4 shift valve 30.

As the valve spools 276 and 244 are displaced towards the left by the springs 290 and 252, respectively, pressure fed to the 1-2 shift valve 24 and the 2-4/3-4 shift valve 30 actuates the first and fourth friction members C1 and C4 to perform the shifting to the first speed of the "L" range.

Figure 24:
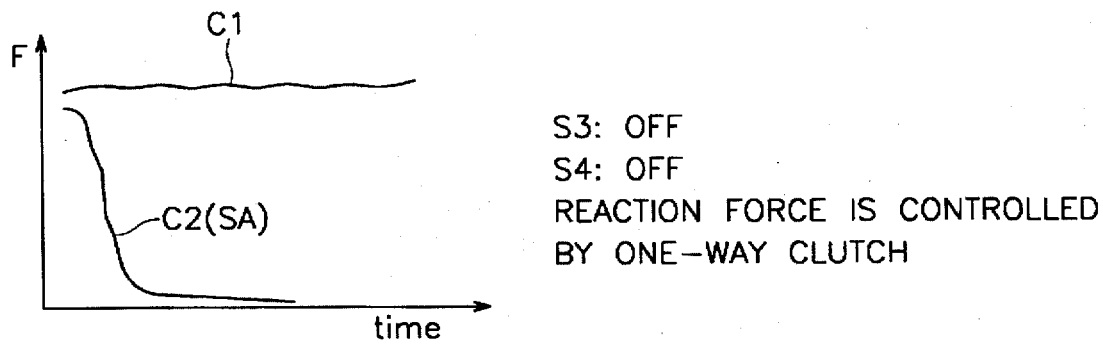
FIG. 24 is the hydraulic operation graph of the control system during second-to-first speed down-shifting at the "D" range.

Also, though not shown in the figures, the shifting down from the second speed to the first speed of the "L" range is performed as pressure at the actuating conduit of the second friction member C2 is exhausted with the controlling of a one-way clutch. During this shifting process, the first friction member C1 is actuated by a constant pressure, pressure at the actuating conduit of the second friction member C2 is abruptly exhausted, and the one-way clutch acts as a reaction member as shown in FIG. 24.

"R" Range Operation

Figure 16:
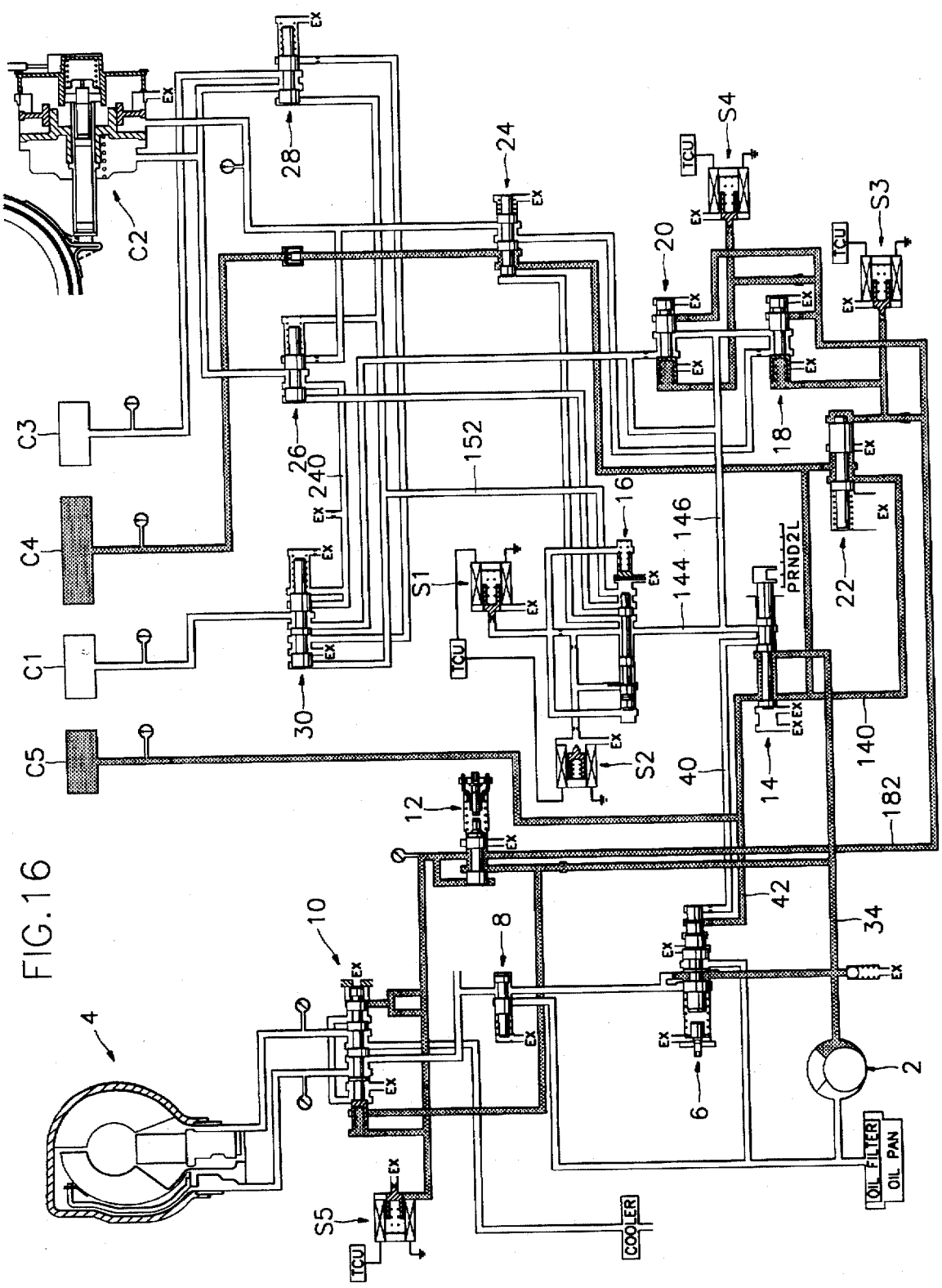
FIG. 16 is the hydraulic circuit diagram of FIG. 1 showing the operation of the control system during a reverse "R" range.
Figure 17:
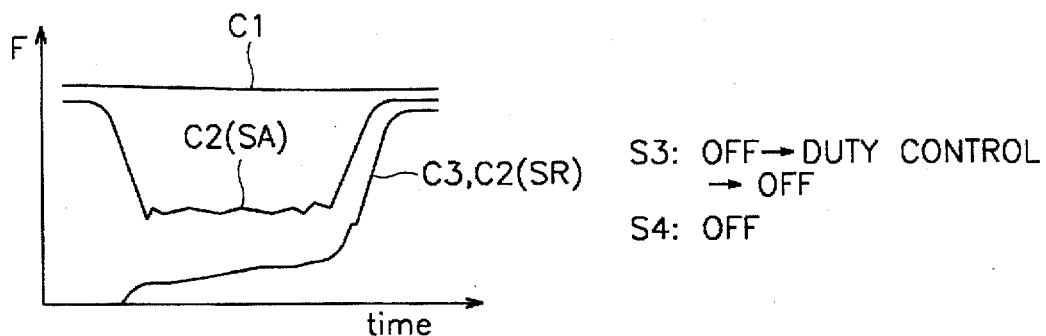
FIG. 17 is the hydraulic operation graph of the control system during second-to-third speed up-shifting at the "D" range.

FIG. 16 diagrams the operation of the hydraulic control system according to the present invention during the shifting to the "R" range. As the vehicle operator selects the "R" range of the shift select lever, the manual valve 14, interconnected with the shift select lever, is changed. Pressure from the hydraulic pump 2 is fed to the first port 132 of the manual valve 14 and to the reverse pressure conduit 42 via the fourth port 138 to actuate the fifth friction member C5, and fed to the pressure regulating valve 6 to control line pressure. Also, some fluids are fed to the second port 190 of the N-R control valve 22.

As pressure reduced by the pressure reducing valve 12 allows the valve spool 184 of the N-R control valve 22 to be displaced towards the left, according to a duty-control of the first pressure control solenoid valve S3, and allows the second port 190 and the third port 192 of the N-R control valve 22 to be connected to each other, pressure from the second port 190 is fed to the fourth port 280 of the 1-2 shift valve 24 to displace the valve spool 276 towards the right and fed to the fourth friction member C4 to perform the shifting to the "R" range.

Thus, pressure is fed to the fourth and fifth friction members C4 and C5 at the "R" range to drive the vehicle backward.

As described above, the fourth-to-first and fourth-to-second speed kickdown shifting, and the second-to-fourth speed lift foot up can be accomplished and shift response can be remarkably improved according to the hydraulic control system present invention. Also, the friction members actuated at the first, second and third speeds of "D" range and the friction members actuated at the third and fourth speeds of "D" range can be independently controlled to allow the hydraulic control system to be controlled easily and improve the feeling in shifting.

What is claimed is:

1. A hydraulic control system for automatic transmissions, comprising:

a hydraulic pump for pressurizing fluids;

a torque converter for transmitting engine power to the automatic transmission; a pressure regulating valve connected to the hydraulic pump, together with a damper clutch, for varying line pressure by a damper clutch control solenoid valve controlled according to a duty ratio when converting a drive mode and driving at high speeds;

a reducing valve connected to the hydraulic pump for reducing line pressure;

a manual valve operated by a shift select lever for selectively feeding pressure from the hydraulic pump to a drive pressure conduit at a "D" range and to a fifth friction member via a reverse pressure conduit at an "R" range;

a shift control valve connected to the drive pressure conduit for feeding drive pressure to a plurality of shift valves by operation of two shift control solenoid valves which are controlled to ON/OFF states or controlled according to duty ratios by a transmission control unit according to vehicle speed and throttle valve opening;

a 2-4/3-4 shift valve for feeding drive pressure to a first friction member at first, second and third speeds of the "D" range and to a third friction member at a fourth speed of the "D" range and exhausting pressure from the first friction member when third-to-fourth and second-to-fourth speed shifting;

a first pressure control valve controlled by a first pressure control solenoid valve for feeding drive pressure to the second and third friction members at the second, third and fourth speeds of the "D" range;

a second pressure control valve controlled by a second pressure control solenoid valve according to a duty ratio for feeding pressure to the first friction member at the first, second and third speeds of the "D" range and to the third friction member at the fourth speed of the "D" range by the 2-4/3-4 shift valve;

a 1-2 shift valve for feeding pressure to the second and third friction members and for feeding drive pressure from the 2-4/3-4 shift valve to the third friction member at the fourth speed according to second speed line pressure of the shift control valve;

an end clutch valve for feeding pressure to the third friction member according to fourth speed line pressure of the shift control valve; and a 2-3/4-3 shift valve for feeding pressure to the actuating conduit of the third friction member at the third speed according to third and fourth speed line pressure from the shift control valve and for releasing pressure of the second and third friction members when third-to-fourth, fourth-to-second, fourth-to-first and third-to-second speed shifting;

wherein the first pressure control solenoid valve is Controlled to an ON state to prevent drive pressure from being fed to the 1-2 shift valve at the first speed of the "D" range and to feed drive pressure from the second pressure control solenoid valve to the first friction member via the second pressure control valve and the 2-4/3-4 shift valve.

2. A hydraulic control system of an automatic transmission as claimed in claim 1 wherein the 2-4/3-4 shift valve is connected to the end clutch valve to feed pressure from the first pressure control valve to the third friction member at the fourth speed.

3. A hydraulic control system of an automatic transmission as claimed in claim 1 wherein an orifice is provided in an exhaust conduit connecting the 2-4/3-4 shift valve and the 2-3/4-3 shift valve to provide time lags in releasing the second and third friction members when shifting fourth-to-second, fourth-to-first and third-to-second speed shifting.

4. A hydraulic control system of an automatic transmission as claimed in claim 1 wherein the first pressure control valve is controlled to an OFF state at the second speed of the "D" range to feed drive pressure to the second friction member via the 1-2 shift valve.

5. A hydraulic control system of an automatic transmission as claimed in claim 1 wherein the shift control valve controls the 1-2 shift valve by opening only a second speed line to feed pressure to the second friction member, to feed pressure from the first pressure control valve to the first friction member via the 2-4/3-4 shift valve and to release the second and third friction members via the 2-3/4-3 shift valve to perform kickdown skip shifting from the fourth speed to the second speed.

6. A hydraulic control system of an automatic transmission as claimed in claim 1 wherein the shift control valve, during shifting from the second speed to the fourth speed, controls the 1-2 shift valve by opening the second, third and fourth speed lines to feed pressure from the first pressure control valve to the second friction member via the end clutch valve and controls the 2-4/3-4 shift valve to feed pressure from the second pressure control valve to the third friction member via the end clutch valve and to release the first friction member.

7. A hydraulic control system of an automatic transmission as claimed in claim 1 wherein the 2-4/3-4 shift valve includes a valve body having a first port connected to the second pressure control valve, a second port connected to a fourth speed line of the shift control valve, a third port connected to the 2-3/4-3 shift valve, a fourth port formed adjacent to the first port and connected to the end clutch valve, a fifth port connected to the first friction member, and a sixth port connected to the third port and a conduit connected to the 2-3/4-3 shift valve; and a valve spool having a first land on which pressure coming through the second port acts, a second land for selectively allowing the first and fifth ports to be connected to each other, and a third land for selectively allowing the third and fifth ports to be connected to each other, the valve spool being biased by a spring.

8. A hydraulic control system of an automatic transmission as claimed in claim 1 wherein the 2-3/4-3 shift valve includes a valve body having a first port connected to a third speed line of the shift control valve, a second port connected to a third port of the 2-4/3-4 shift valve via a conduit having an exhaust outlet in the middle thereof, a third port to which pressure from the 1-2 shift valve is fed, a fourth port for releasing the second friction member, and a fifth port connected to a fourth speed line; and a valve spool having a first land on which pressure from the third speed line acts and a second land for selectively opening the third port, the valve spool being biased by a spring.

9. A hydraulic control system of an automatic transmission as claimed in claim 1 wherein the end clutch valve includes:

a valve body having first and second ports connected to the 2-4/3-4 shift valve and a fourth speed line of the shift control valve, a third port connected to a fourth port of the 2-3/4-3 shift valve, and a fourth port connected to the third friction member; and a valve spool having a first land on which pressure from the second port acts and a second land for selectively closing the first port, the valve spool being biased by a spring at a right end thereof.

* * * * *